United States Patent
Sudo et al.

(10) Patent No.: US 6,944,119 B1
(45) Date of Patent: Sep. 13, 2005

(54) OFDM RECEIVING APPARATUS, OFDM TRANSMISSION APPARATUS AND OFDM COMMUNICATION METHOD

(75) Inventors: Hiroaki Sudo, Yokohama (JP); Kimihiko Ishikawa, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/550,167

(22) Filed: Apr. 14, 2000

(30) Foreign Application Priority Data

Oct. 29, 1998 (JP) ............................ 10-308913
Jul. 29, 1999 (JP) ............................ 11-215459

(51) Int. Cl.⁷ ............................................. H04M 11/06
(52) U.S. Cl. ...................... 370/208; 370/350; 370/503
(58) Field of Search ............... 370/480, 203–206, 370/208, 210, 335, 342, 505, 507, 509, 510, 512, 514, 515, 520, 517, 516, 350; 217/1, 15

(56) References Cited

U.S. PATENT DOCUMENTS

| | | | | |
|---|---|---|---|---|
| 5,771,224 A | * | 6/1998 | Seki et al. ................ | 370/206 |
| 6,091,702 A | * | 7/2000 | Saiki ....................... | 370/203 |
| 6,160,791 A | * | 12/2000 | Bohnke .................... | 370/208 |
| 6,160,821 A |   | 12/2000 | Dolle et al. | |
| 6,175,550 B1 | * | 1/2001 | van Nee .................. | 370/206 |
| 6,215,819 B1 | * | 4/2001 | Hyakudai et al. ........ | 375/240 |
| 6,246,735 B1 | * | 6/2001 | Sano et al. .............. | 375/364 |
| 6,304,611 B1 | * | 10/2001 | Miyashita et al. ........ | 375/260 |
| 6,314,083 B1 | * | 11/2001 | Kishimoto et al. ....... | 370/210 |
| 6,381,251 B1 | * | 4/2002 | Sano et al. .............. | 370/480 |
| 6,611,493 B1 | * | 8/2003 | Miyashita et al. ........ | 370/208 |
| 6,625,111 B1 | * | 9/2003 | Sudo ........................ | 370/203 |
| 6,771,591 B1 | * | 8/2004 | Belotserkovsky et al. .. | 370/210 |

FOREIGN PATENT DOCUMENTS

| | | |
|---|---|---|
| EP | 1073241 | 1/2001 |
| JP | 08265291 | 10/1996 |
| JP | 11215097 | 8/1999 |
| JP | 2000068972 | 3/2000 |
| JP | 2000201131 | 7/2000 |

OTHER PUBLICATIONS

Japanese Office Action dated Mar. 30, 2004, with English translation.

Akinori Taira et al., "A Study on Timing Synchronization Technique for OFDM," Technical Report of IEICE, CS99–41, RCS99–33 (Jun. 1999), pp. 49–54, in Japanese, with abstract in English thereof and two pages of comments provided by Applicants.

Nobuaki Mochizuki et al., "Frequency and Timing Error Control Technique using a Broadcast Channel for OFDM," IEICE, Sogo Taikai (1999, B–5–10), p. 361, in Japanese, with abstract in English thereof and one page of comments provided by Applicants.

* cited by examiner

*Primary Examiner*—Chau Nguyen
*Assistant Examiner*—Ricardo Pizarro
(74) *Attorney, Agent, or Firm*—Stevens, Davis, Miller & Mosher, LLP

(57) ABSTRACT

Synchronization symbol insertion section 102: inserts a synchronization symbol into a signal digital-modulated by modulation section 101. 0 symbol insertion section 103 inserts a 0 symbol into the signal with the synchronization symbol inserted. The signal with the synchronization symbol and 0 symbol inserted in this way is sent to IFFT section 104 to be subjected to an IFFT calculation. Then, guard interval insertion section 105 inserts a guard interval into the IFFT transformed signal waveform. Then, the signal with the guard interval inserted in this way is D/A-converted by D/A converter 106. The D/A-converted signal is subjected to normal radio transmission processing and then transmitted.

3 Claims, 24 Drawing Sheets

OFDM RECEIVING APPARATUS, OFDM TRANSMISSION APPARATUS AND OFDM COMMUNICATION METHOD

BACKGROUND OF THE INVENTION

1. Field of the Invention

The present invention relates to an OFDM communication apparatus used in a radio communication system.

2. Description of the Related Art

A conventional OFDM communication apparatus is explained using FIG. 1. FIG. 1 is a block diagram showing a configuration of a conventional OFDM communication apparatus.

In the OFDM communication apparatus shown in FIG. 1, an information signal for every subcarrier is subjected to digital modulation processing by modulation section 1 through, for example, QPSK (Quadrature Phase Shift Keying) and QAM (Quadrature Amplitude Modulation) and a synchronization symbol is then inserted into this signal by synchronization symbol insertion section 2.

The signal with the synchronization symbol inserted is subjected to an IFFT (Inverse Fast Fourier Transform) calculation by IFFT section 3 and converted to an OFDM signal.

A guard interval is inserted into this OFDM signal by guard interval insertion section 4. As shown in FIG. 2, this signal frame is configured by synchronization symbol 21, phase reference symbol or pilot symbol 22, guard interval 23 and valid symbol 24.

The signal with the guard interval inserted is D/A-converted to a baseband signal by D/A converter 5. This baseband signal is subjected to normal radio transmission processing by a radio transmission section, which is not shown in the figure, and transmitted from an antenna as a transmission signal.

A signal received via an antenna is subjected to normal radio reception processing by a radio reception section, which is not shown in the figure, and converted to a baseband signal. This baseband signal is subjected to quasi-coherent detection by a quasi-coherent detector and stripped of an unnecessary frequency component by a low-pass filter (the quasi-coherent detector and low-pass filter are not shown in the figure). This baseband signal is A/D-converted by A/D converter 6. In addition, the reception signal is divided into an in-phase component and quadrature component through quasi-coherent detection processing but the figure only shows a single signal path.

This baseband signal is subjected to an FFT (Fast Fourier Transform) calculation by FFT section 12 and signals assigned to different subcarriers are obtained. At this time, the baseband signal is delayed by delay section 7, sent to multiplier 8 and the multiplication result is accumulated by accumulator 9. The accumulation result is sent to subtractor 10 to be subjected to a subtraction with a threshold and subjected to threshold judgment by determination section 11. This determination result is sent to FFT section 12.

The signal FFT-calculated by FFT section 12 is sent to demodulation section 13, subjected to delay detection, judged by determination section 14 as to whether the signal is different from a signal one bit ahead and output as a demodulated signal.

When symbol synchronization is established in the OFDM communication apparatus with the configuration above, the baseband signal prior to FFT calculation and the signal prior to FFT calculation delayed by one symbol by delay section 7 are sent to multiplier section 8 to be subjected to complex multiplication.

Then, the output of multiplier 8 is sent to accumulator 9 where the complex multiplication results are accumulated. Here, since the phase reference symbol is identical to the synchronization symbol, the result of accumulation of both signals has a peak on the phase reference symbol of the signal delayed by one symbol as shown in part A of FIG. 3. Therefore, It is possible to establish symbol synchronization by detecting timing at which the accumulation result exceeds a threshold.

However, signals with high power may be included under circumstances under which tens of delay signals are received. In this case, since threshold judgment is carried out using power of correlation results, it is assumed that a signal with high power may exceed the threshold. In such a case, symbol synchronization may be established using a signal with high power, failing to correctly detect FFT processing start timing and resulting in desynchronization.

SUMMARY OF THE INVENTION

The present invention has been implemented taking account of the points described above and it is an objective of the present invention to provide an OFDM communication apparatus capable of correctly detecting FFT processing start timing even under circumstances under which tens of delay signals are received and preventing desynchronization.

A main point of the present invention is an insertion of a correlation value suppression signal immediately after a symbol used to pull in synchronization. As a result, when establishing symbol synchronization by carrying out correlation value processing using the reception signal, the receiving side can reduce the correlation result of a signal with high power so that a peak appears only on the correlation value result using the above symbol for the reception signal. This makes it possible to correctly detect FFT processing start timing and implement symbol synchronization free of desynchronization.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

With reference now to the attached drawings, the embodiments of the present invention are explained in detail below.

(Embodiment 1)

Figure 5:
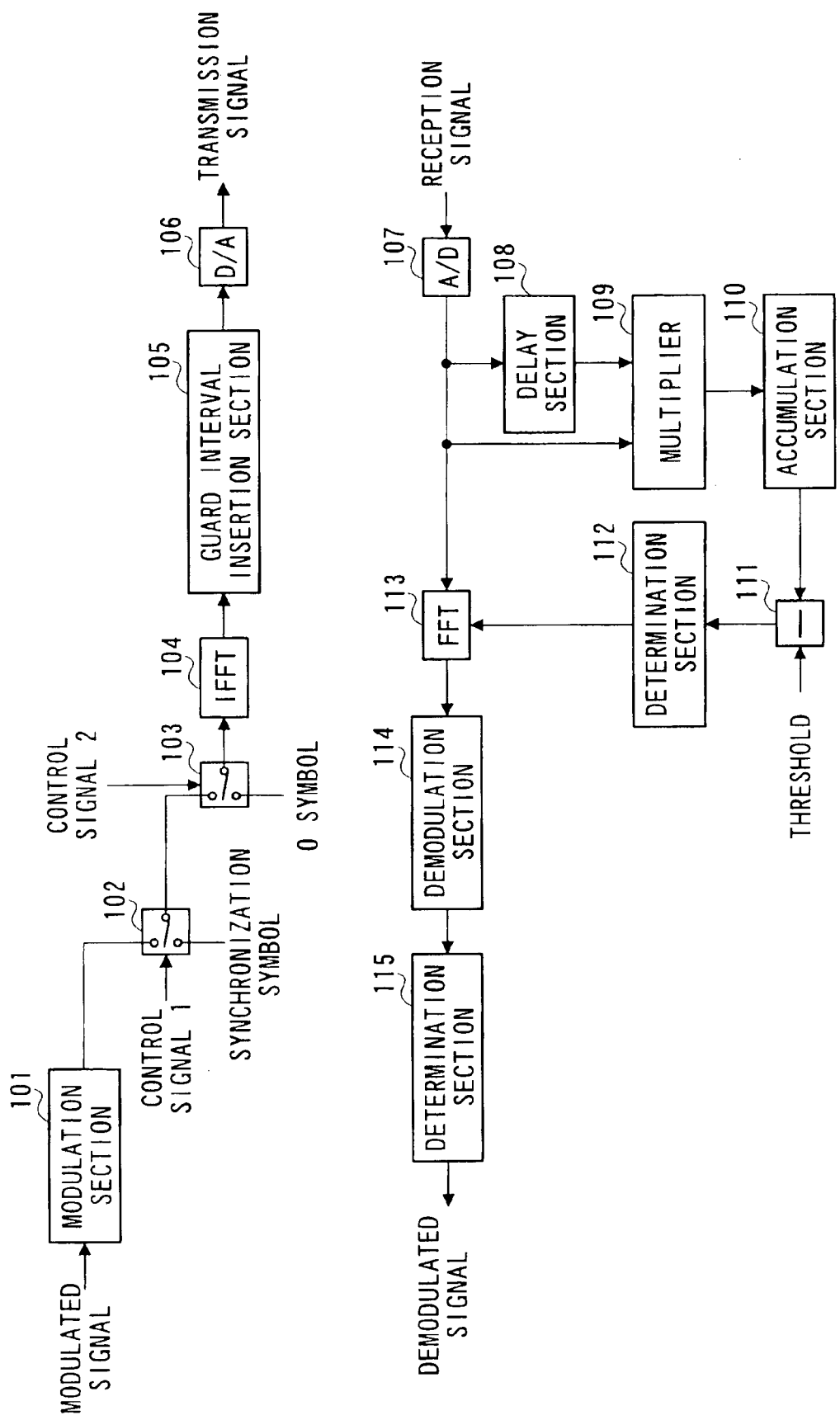
FIG. 5 is a block diagram showing a configuration of an OFDM communication apparatus according to Embodiment 1 of the present invention.

FIG. 5 is a block diagram showing a configuration of an OFDM communication apparatus according to Embodiment 1 of the present invention.

An information signal for every subcarrier is subjected to digital modulation processing by modulation section 101 through, for example, QPSK (Quadrature Phase Shift Keying) and QAM (Quadrature Amplitude Modulation) and then a synchronization symbol is added to this signal by synchronization symbol insertion section 102 and then a 0 symbol, which is a correlation value suppression signal, is added by 0 symbol insertion section 103.

The signal with these symbols added is subjected to an IFFT (Inverse Fast Fourier Transform) calculation by IFFT section 104 and converted to an OFDM signal. A guard interval is inserted into this OFDM signal by guard interval insertion section 105. The signal with the guard interval inserted is D/A-converted to a baseband signal by D/A converter 106. This baseband signal is subjected to normal radio transmission processing by a radio transmission section, which is not shown in the figure, and transmitted from an antenna as a transmission signal.

A signal received via an antenna is subjected to normal radio reception processing by a radio reception section, which is not shown in the figure, and converted to a baseband signal. This baseband signal is subjected to quasi-coherent detection by a quasi-coherent detector and stripped of an unnecessary frequency component by low-pass filter (the quasi-coherent detector and low-pass filter are not shown in the figure). This baseband signal is A/D-converted by A/D converter 107. In addition, the reception signal is divided into an in-phase component and quadrature component through quasi-coherent detection processing but the figure only shows a single signal path.

This baseband signal is subjected to an FFT (Fast Fourier Transform) calculation by FFT section 113 and signals assigned to different subcarriers are obtained. At this time, the baseband signal is delayed by delay section 108, sent to multiplier 109 and the multiplication result is accumulated by accumulator 110. The accumulation result is sent to subtractor 111 to be subjected to a subtraction with a threshold and subjected to threshold judgment by determination section 112. This determination result is sent to FFT section 113.

The signal FFT-calculated by FFT section 113 is sent to demodulation section 114, subjected to delay detection, judged by determination section 115 as to whether the signal is different from a signal one bit ahead and output as a demodulated signal.

Figure 6:
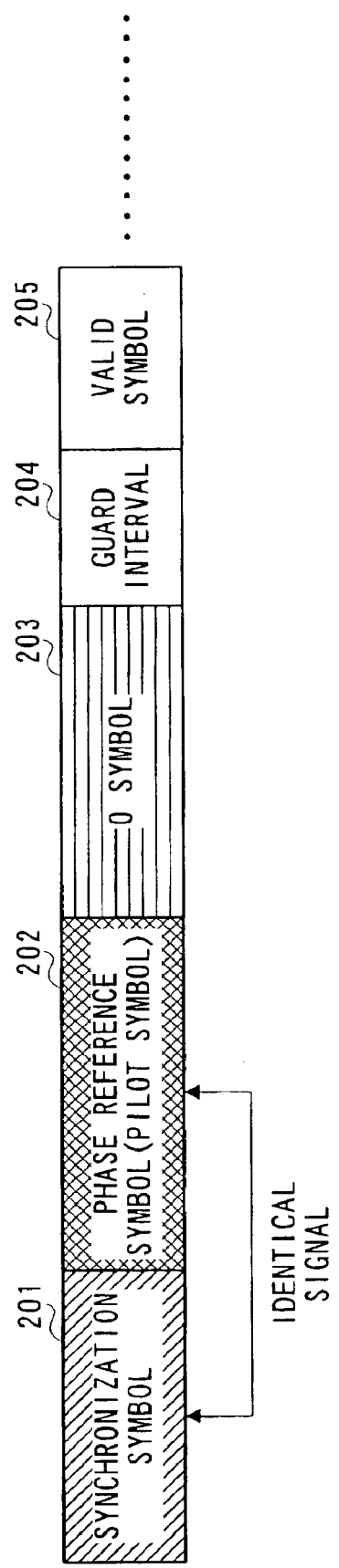
FIG. 6 is a frame chart of a signal used by the OFDM communication apparatus according to the embodiment above.

Then, the operation of the OFDM communication apparatus with the above configuration is explained using FIG. 5 and FIG. 6. Synchronization symbol 201 is inserted into the signal digital-modulated by modulation section 101 by synchronization symbol insertion section 102. This synchronization symbol insertion section 102 is made up of a switch and when control signal 1 instructing synchronization symbol 201 to be inserted is input, this switch is switched to insert synchronization symbol 201. After synchronization symbol 201, phase reference symbol 202 is inserted. This phase reference symbol 202 is identical to synchronization symbol 201. This phase reference symbol 202 is inserted by synchronization symbol insertion section 102 in like manner.

0 symbol insertion section 103 inserts 0 symbol 203 into the signal with synchronization symbol 201 inserted. This 0 symbol insertion section 103 is made up of a switch and when control signal 2 instructing 0 symbol 203 to be inserted is input, this switch is switched to insert 0 symbol 203.

The signal with synchronization symbol 201 and 0 symbol 203 inserted is sent to IFFT section 104 and subjected to an IFFT calculation. That is, IFFT section 104 obtains a signal waveform on the time axis by IFFT-transforming complex number data including information on the phase and amplitude on the frequency axis onto the time axis for every symbol cycle.

Then, guard interval 204 is inserted into the IFFT-transformed signal waveform by guard interval insertion section 105. More specifically, part of a waveform of the last edge of valid symbol 205 is inserted as guard interval 204. In this way, it is possible to suppress an increase in the bit error rate and improve multi-path resistance by inserting guard interval 204 that allows a delay time.

Then, the signal with this guard interval inserted is D/A-converted by D/A converter 106. Then, the D/A-converted signal is subjected to normal radio transmission processing and then transmitted. That is, the above signal is frequency-converted and amplified by a radio transmission section, which is not shown in the figure, and transmitted from an antenna.

On the other hand, a signal received from an antenna is subjected to normal radio reception processing. That is, the reception signal is subjected to amplification, frequency conversion and A/D conversion to become a baseband signal by a radio reception section, which is not shown in the figure. As described above, the reception signal is divided into an in-phase component and quadrature component by a quasi-coherent detector, which is not shown in the figure, and processed, but these are expressed as one path in the figure.

Here, for the baseband signal, symbol synchronization is established using a guard interval. The method of establishing this symbol synchronization (synchronization pull-in method) is explained below.

First, the baseband signal prior to FFT calculation and the signal prior to FFT calculation delayed by one symbol by delay section 108 are sent to multiplier 109 to be subjected to complex multiplication.

Figure 3:
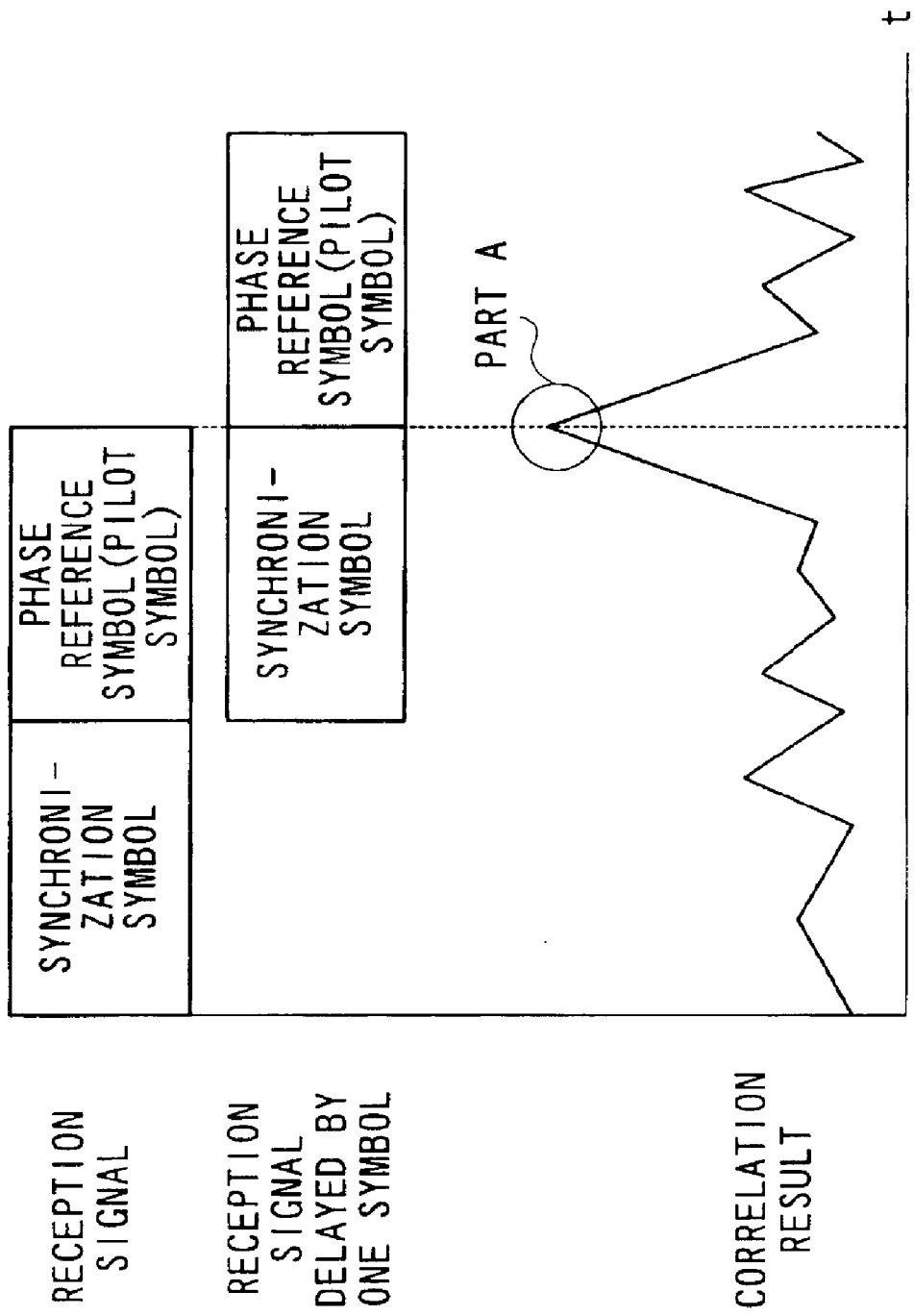
FIG. 3 is a diagram showing timing of a reception signal and correlation result.

Then, the output of multiplier 109 is sent to accumulation section 110, which accumulates the complex multiplication results. Here, since the phase reference symbol is identical to the synchronization symbol, the accumulation result of both symbols has a peak on a phase reference symbol of the signal delayed by a unit symbol (here 1 symbol) as shown in part A of FIG. 3. Therefore, it is possible to establish symbol synchronization by detecting timing at which the accumulation result exceeds the threshold.

Thus, the accumulation result, which is the output of accumulation section 110, is sent to subtractor 111 to be subjected to a subtraction from a predetermined threshold and the subtraction result is sent to determination section 112 to judge which is larger or smaller. This allows threshold judgment and timing that exceeds the threshold can be regarded as the FFT processing start timing in FFT section 113. In this way, timing is provided so that FFT is started by establishing symbol synchronization between the transmitting side and receiving side.

As shown in FIG. 6, in the present embodiment, 0 symbol 203 is inserted after phase reference symbol 202 in a signal frame. Therefore, under circumstances under which tens of delay signals are received, if signals with high signal power are included, correlation processing is carried out between the 0 symbol of the reception signal and the phase reference symbol when a correlation is found between the reception signal and the signal delayed by one symbol. In this case, since correlation processing is performed with the 0 symbol, the correlation result becomes very small no matter how high the signal power may be. For this reason, a peak exceeding a threshold is identified near the FFT processing start timing, thus making it possible to accurately detect the FFT processing start timing.

The A/D-converted baseband signal is subjected to FFT processing at the FFT processing start timing above in FFT section 113 to obtain signals assigned to their respective subcarriers. These signals are sent to demodulation section 114, subjected to delay detection processing, compared with the signal one bit ahead by determination section 115 to become a demodulated signal.

As shown above, since the OFDM-communication apparatus of the present embodiment has the 0 symbol inserted immediately after the phase reference symbol used for delay detection, making it possible to reduce correlation output near the synchronization timing position. Therefore, the OFDM communication apparatus of the present embodiment can suppress a correlation value exceeding a threshold even if signals with high power are included. As a result, the OFDM communication apparatus of the present embodiment can accurately detect FFT processing start timing and prevent desynchronization.

(Embodiment 2)

The present embodiment explains a case where a 0 signal of an interval shorter than the phase reference symbol cycle is inserted immediately after the phase reference symbol.

Figure 7:
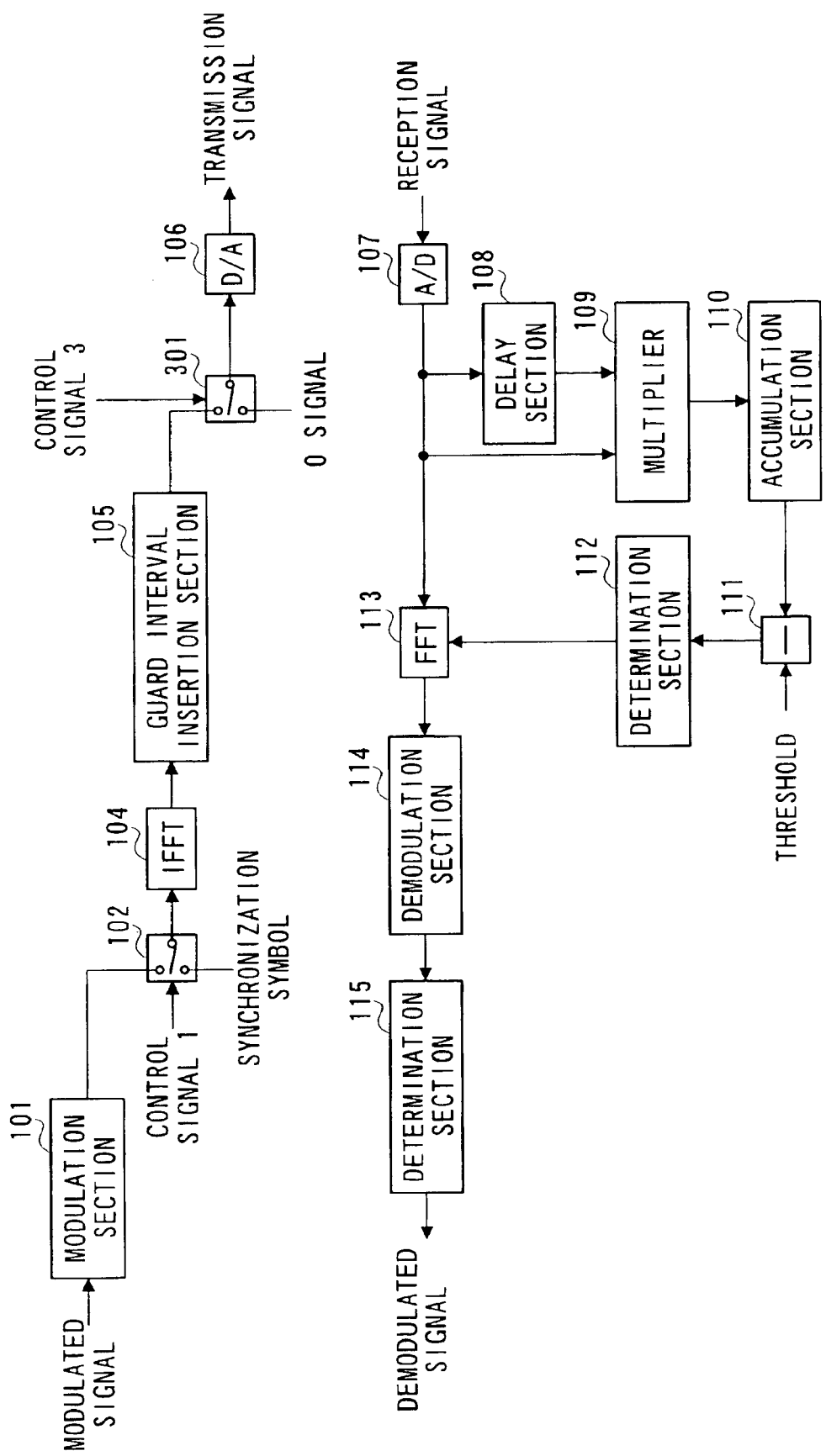
FIG. 7 is a block diagram showing a configuration of an OFDM communication apparatus according to Embodiment 2 of the present invention.

FIG. 7 is a block diagram showing a configuration of the OFDM communication apparatus according to Embodiment 2 of the present invention. In FIG. 7, the same parts as those in FIG. 5 are assigned the same codes as those in FIG. 5 and their detailed explanations are omitted.

In the OFDM communication apparatus shown in FIG. 7, the transmission section carries out IFFT processing on a signal with a synchronization symbol inserted, inserts a guard interval and then inserts a 0 signal. Therefore, 0 symbol insertion section 103 is removed and 0 signal insertion section 301 is provided after guard interval insertion section 105.

Figure 8:
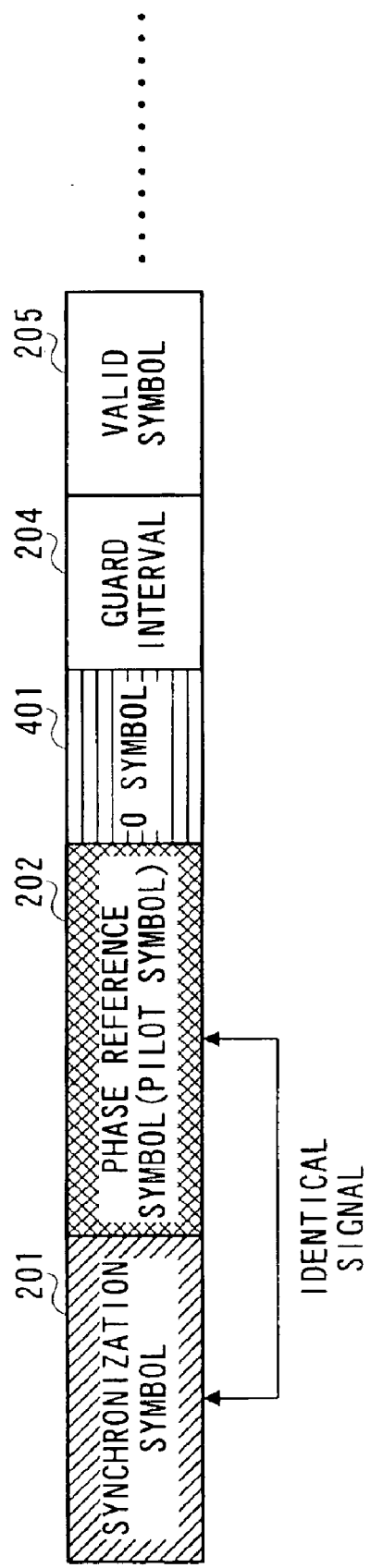
FIG. 8 is a frame chart of a signal used by the OFDM communication apparatus according to the embodiment above.

Then, the operation of the OFDM communication apparatus with the above configuration is explained using FIG. 7 and FIG. 8. Synchronization symbol 201 is inserted by synchronization symbol insertion section 102 into the signal digital-modulated by modulation section 101 as in the case of Embodiment 1. Phase reference symbol 202 is inserted after synchronization symbol 201. This phase reference symbol 202 is identical to synchronization symbol 201. This phase reference symbol 202 is inserted by synchronization symbol insertion section 102 in like manner.

The signal with synchronization symbol 201 inserted is sent to IFFT section 104 and subjected to an IFFT calculation. Then, guard interval 204 is inserted into the IFFT-transformed signal waveform by guard interval insertion section 105.

Then, a 0 signal, which is a correlation value suppression signal, is inserted into the signal with the guard interval inserted by 0 signal insertion section 301. This 0 signal insertion section 301 is made up of a switch and when control signal 3 instructing 0 signal 401 to be inserted is input, this switch is switched to insert 0 signal 401. The interval of this 0 signal 401 is set to be shorter than the cycle of phase reference symbol 202. For example, it is preferable to set the interval to approximately ¼ symbol. This minimizes the interval during which signals without power are sent.

Then, the signal with such a 0 signal inserted is D/A-converted by D/A converter 106. Then, the D/A-converted signal is subjected to normal radio transmission processing and then transmitted. That is, the above signal is frequency-converted and amplified by a radio transmission section, which is not shown in the figure, and transmitted from an antenna.

On the other hand, a signal received from an antenna is subjected to normal radio reception processing. For the baseband signal, symbol synchronization is established using a guard interval as in the case of Embodiment 1.

As shown in FIG. 8, the present embodiment has 0 signal 401 inserted after phase reference symbol 202 in a signal frame. Therefore, under circumstances under which tens of delay signals are received, if signals with high signal power are included, correlation processing is carried out between the 0 signal of the reception signal and the phase reference symbol when a correlation is found between the reception signal and the signal delayed by one symbol. In this case, since correlation processing is performed with the 0 signal, the correlation result becomes very small no matter how high the signal power may be. For this reason, a peak exceeding a threshold is identified near the FFT processing start timing, thus making it possible to accurately detect the FFT processing start timing.

The A/D-converted baseband signal is subjected to FFT processing at the FFT processing start timing above in FFT section 113 to obtain signals assigned to their respective subcarriers. These signals are sent to demodulation section 114, subjected to delay detection processing, compared with the signal one bit ahead by determination section 115 to become a demodulated signal.

As shown above, since the OFDM communication apparatus of the present embodiment has the 0 signal inserted immediately after the phase reference symbol used for delay detection, making it possible to reduce correlation output near the synchronization timing position. Therefore the OFDM communication apparatus of the present embodiment can suppress a correlation value exceeding a threshold even if signals with high power are included. As a result, the OFDM communication apparatus the present embodiment can accurately detect FFT processing start timing and prevent desynchronization. Furthermore, since the 0 signal inserted immediately after the phase reference symbol is shorter than the phase reference symbol cycle, thus minimizing the interval during which signals without power are sent.

(Embodiment 3)

The present embodiment explains a case where reception level information is used for symbol synchronization acquisition.

Figure 9:
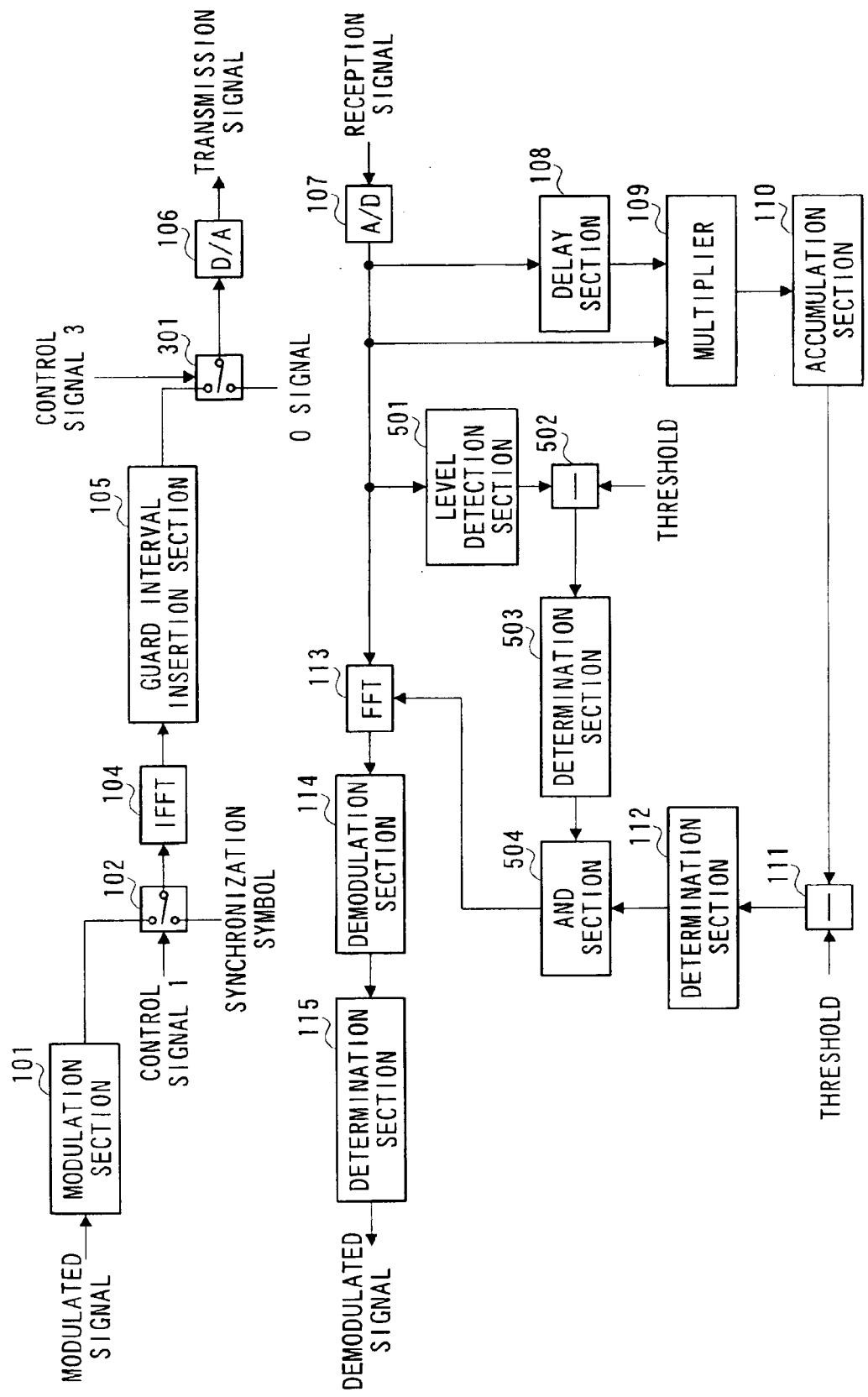
FIG. 9 is a block diagram showing a configuration of an OFDM communication apparatus according to Embodiment 3 of the present invention.

FIG. 9 is a block diagram showing a configuration of the OFDM communication apparatus according to Embodiment 3 of the present invention. In FIG. 9, the same parts as those in FIG. 7 are assigned the same codes as those in FIG. 7 and their detailed explanations are omitted.

In the OFDM communication apparatus shown in FIG. 9, the reception section comprises level detection section 501 that detects the reception level of a baseband signal, subtraction section 502 that compares the detected level with a predetermined threshold, determination section 503 that judges which is larger or smaller based on the subtraction result and AND section 504 that calculates AND between the determination result of determination section 503 and the determination result for FFT processing start timing detection.

Then, the operation of the OFDM communication apparatus with the above configuration is explained using FIG. 9.

The operation on the transmitting side is the same as that in Embodiment 2. Therefore, a signal to be transmitted has a frame configuration as shown in FIG. 8.

On the other hand, a signal received from an antenna is subjected to normal radio reception processing. For a baseband signal, symbol synchronization is established using a guard interval in the same way as for Embodiment 1.

In the present embodiment, a baseband signal is sent to level detection section 501 to be subjected to level detection and that level is sent to level subtraction section 502 to be subjected to a subtraction with a predetermined threshold. This subtraction result is sent to determination section 503 and judged which is larger or smaller. That is, the detected level is subjected to threshold judgment.

Moreover, as in the case of Embodiment 2, the result of a correlation between the reception signal and the signal delayed by one symbol is subjected to threshold judgment. The result of threshold judgment of the above level and the result of threshold judgment of the correlation are sent to AND section 504 and the AND information is sent to FFT section 113. That is, the timing at which the detected level is lower than the threshold in the threshold judgment of level detection and the correlation result is higher than the threshold in the threshold judgment of the correlation result becomes the FFT processing start timing.

The A/D-converted baseband signal is subjected to FFT processing at the FFT processing start timing above in FFT section 113 to obtain signals assigned to their respective subcarriers. These signals are further sent to demodulation section 114 to be subjected to delay detection processing, compared with the signal one bit ahead by determination section 115 to become a demodulated signal.

As shown above, the OFDM communication apparatus of the present embodiment can suppress a correlation value exceeding a threshold even if signals with high power are included, accurately detect the FFT processing start timing and prevent desynchronization. Furthermore, since the 0 signal inserted immediately after the phase reference symbol is shorter than the phase reference symbol cycle, thus minimizing the interval during which signals without power are sent. Furthermore, the OFDM communication apparatus of the present embodiment performs level detection of the reception signal, and therefore can accurately detect the signal with a high correlation result and more accurately detect the FFT processing start timing.

(Embodiment 4)

The present embodiment explains a case where the interval into which a 0 signal is inserted is made variable.

Figure 10:
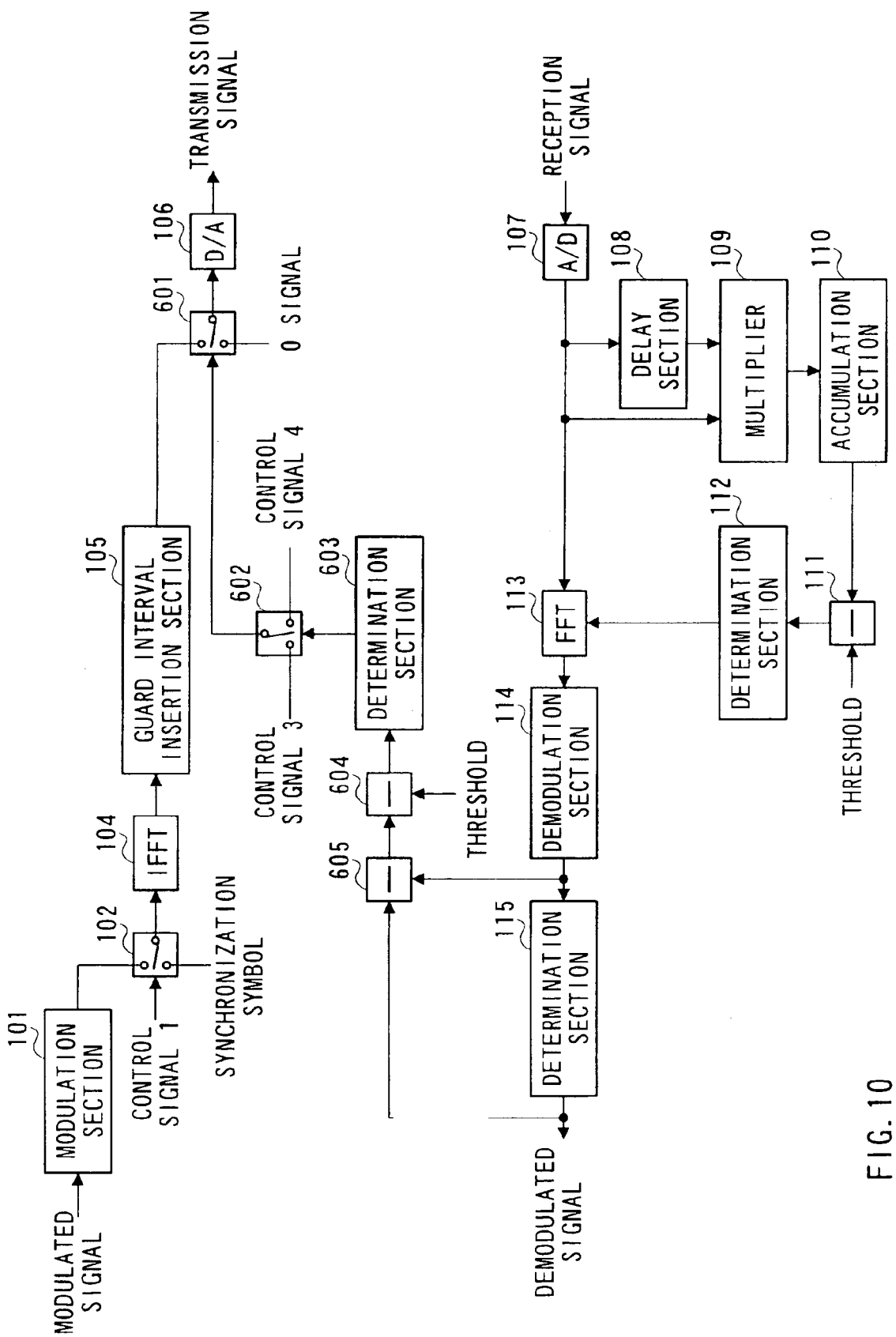
FIG. 10 is a block diagram showing a configuration of an OFDM communication apparatus according to Embodiment 4 of the present invention.

FIG. 10 is a block diagram showing a configuration of the OFDM communication apparatus according to Embodiment 4 of the present invention. In FIG. 10, the same parts as those in FIG. 7 are assigned the same codes as those in FIG. 7 and their detailed explanations are omitted.

The OFDM communication apparatus shown in FIG. 10 includes first subtraction section 605 that calculates a difference between signals before and after judgment by determination section 115, second subtraction section 604 that calculates a difference between this subtraction result and a predetermined threshold, determination section 603 that judges whether the subtraction result of the second subtraction section is larger or smaller, switch 602 that selects whether or not to insert a 0 signal according to this determination result and 0 signal insertion section 601 that inserts a 0 signal immediately after the phase reference symbol.

0 signal insertion section 601 is made up of a switch and when control signal 3 instructing a 0 signal to be inserted is input to switch 602, this switch is switched to insert the 0 signal. Switch 602 is switched through control signal 3 instructing the 0 signal to be inserted and control signal 4 instructing the 0 signal not to be inserted according to the judgment result of determination section 603.

Then, the operation of the OFDM communication apparatus with the above configuration is explained using FIG. 10. Synchronization symbol 201 is inserted by synchronization symbol insertion section 102 into the signal digital-modulated by modulation section 101 as in the case of Embodiment 1. Phase reference symbol 202 is inserted after synchronization symbol 201.

The signal with synchronization symbol 201 inserted is sent to IFFT section 104 and subjected to an IFFT calculation. Then, guard interval 204 is inserted into the IFFT-transformed signal waveform by guard interval insertion section 105.

On the other hand, a signal received from an antenna is subjected to normal radio reception processing. For the baseband signal, symbol synchronization is established using a guard interval as in the case of Embodiment 1.

As shown in FIG. 8, 0 signal 401 is inserted after phase reference symbol 202 in a signal frame. Therefore, correlation processing is carried out between the 0 signal of the reception signal and the phase reference symbol when a correlation is found between the reception signal and the signal delayed by one symbol.

The A/D-converted baseband signal is subjected to FFT processing at the FFT processing start timing above in FFT section 113 to obtain signals assigned to their respective subcarriers. These signals are sent to demodulation section 114 to be subjected to delay detection processing, compared with the signal one bit ahead by determination section 115 to become a demodulated signal.

In the case above, signals before and after judgment are sent to first subtraction section 605 where the difference between the two signals is found. This difference is sent to second subtraction section 604 and compared with a threshold. This comparison result is judged by determination section 603. If the difference is larger than this threshold, determination section 603 judges that the communication environment is ill conditioned, that is, the interval of the 0 signal is short and controls so as to lengthen the interval of the 0 signal.

More specifically, to lengthen the interval of the 0 signal, control signal 3 is input to switch 602 so that switch 602 is switched and the 0 signal is inserted by 0 signal insertion section 601. On the other hand, if there is no need to lengthen the 0 signal, control signal 4 is input to switch 602 so that switch 602 is switched preventing 0 signal insertion section 601 from inserting the 0 signal. Thus, it is possible to adaptively change the interval of the 0 signal in the signal frame.

Then, the signal with the 0 signal inserted in this way is D/A-converted by D/A converter 106. Then, the D/A-converted signal is subjected to normal radio transmission processing and then transmitted. That is, the above signal is frequency-converted and amplified by a radio transmission section, which is not shown in the figure, and transmitted from an antenna.

As shown above, the OFDM communication apparatus of the present embodiment inserts the 0 signal immediately after the phase reference symbol used for delay detection, reducing the correlation output near the synchronization timing position, making it possible to accurately detect the FFT processing start timing and prevent desynchronization. Furthermore, the OFDM communication apparatus of the present embodiment can switch whether or not to insert the 0 signal, making it possible to adaptively change the interval of the 0 signal in a signal frame and flexibly respond to the communication environment.

(Embodiment 5)

The present embodiment explains a case where a phase reference symbol whose polarity is inverted, which is a correlation value suppression symbol, is inserted immediately after the phase reference symbol.

Figure 11:
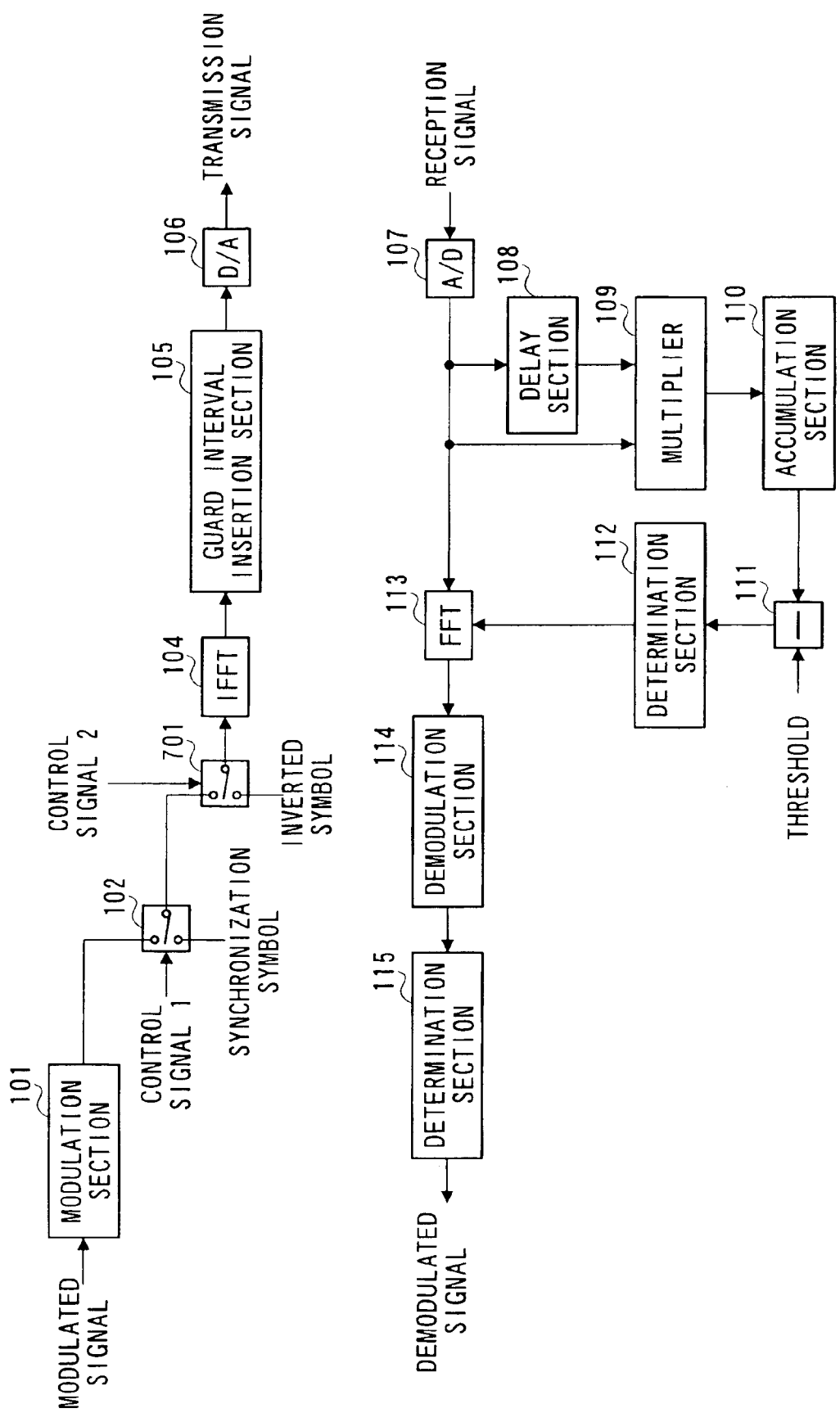
FIG. 11 is a block diagram showing a configuration of an OFDM communication apparatus according to Embodiment 5 of the present invention.

FIG. 11 is a block diagram showing a configuration of the OFDM communication apparatus according to Embodiment 5 of the present invention. In FIG. 11, the same parts as those in FIG. 5 are assigned the same codes as those in FIG. 5 and their detailed explanations are omitted.

In the OFDM communication apparatus shown in FIG. 11, the transmission section inserts an inverted symbol for the signal with a synchronization symbol inserted. Therefore, instead of 0 symbol insertion section 102, inverted symbol insertion section 701 is provided. This inverted symbol insertion section 701 is made up of a switch and when control signal 2 instructing the inverted symbol to be inserted is input, this switch is switched to insert the inverted symbol.

Figure 12:
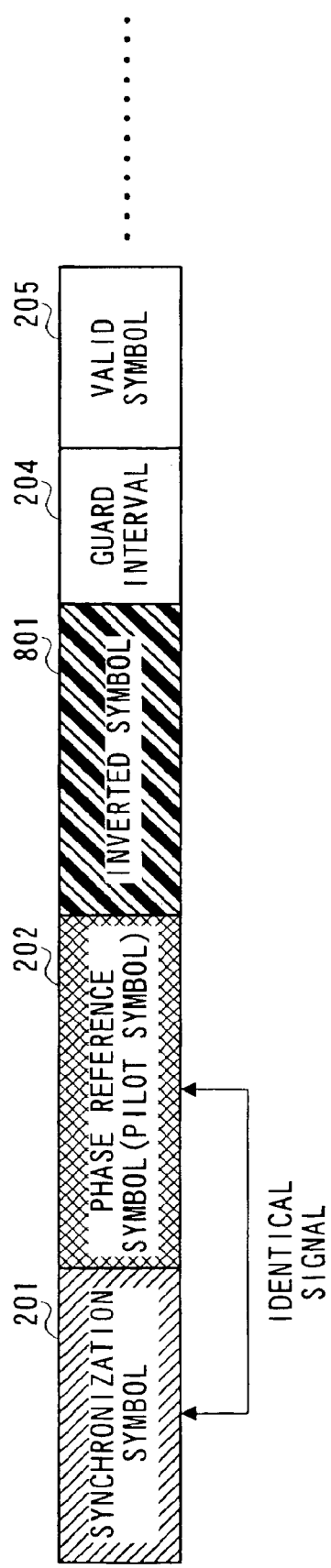
FIG. 12 is a frame chart of a signal used by the OFDM communication apparatus according to the embodiment above.

Then, the operation of the OFDM communication apparatus with the above configuration is explained using FIG. 11 and FIG. 12. Synchronization symbol 201 is inserted by synchronization symbol insertion section 102 into the signal digital-modulated by modulation section 101 as in the case of Embodiment 1. Phase reference symbol 202 is inserted after synchronization symbol 201. This phase reference symbol 202 is identical to synchronization symbol 201. This phase reference symbol 202 is inserted by synchronization symbol insertion section 102 in like manner.

Inverted symbol 801, which is the phase reference symbol inverted by inverted symbol insertion section 701, is inserted into the signal with synchronization symbol 201 inserted. The signal with these symbols inserted is sent to IFFT section 104 to be subjected to an IFFT calculation. Then, guard interval 204 is inserted into the IFFT-transformed signal waveform by guard interval insertion section 105.

Then, the signal with guard interval 204 inserted is D/A-converted by D/A converter 106. Then, the D/A-converted signal is subjected to normal radio transmission processing and transmitted. That is, the above signal is frequency-converted and amplified by a radio transmission section, which is not shown in the figure, and transmitted from an antenna.

On the other hand, a signal received from an antenna is subjected to normal radio reception processing. For the baseband signal, symbol synchronization is established using a guard interval as in the case of Embodiment 1.

As shown in FIG. 12, the present embodiment has inverted symbol 801 inserted after phase reference symbol 202 in a signal frame. Therefore, under circumstances under which tens of delay signals are received, if signals with high signal power are included, correlation processing is carried out between the inverted symbol of the reception signal and the phase reference symbol when a correlation is found between the reception signal and the signal delayed by one symbol. In this case, since correlation processing is performed with the inverted symbol, both symbols are canceled out and the correlation result becomes very small no matter how high the signal power may be. For this reason, a peak exceeding a threshold is identified near the FFT processing start timing, thus making it possible to accurately detect the FFT processing start timing.

The A/D-converted baseband signal is subjected to FFT processing at the FFT processing start timing above in FFT section 113 to obtain signals assigned to their respective subcarriers. These signals are further sent to demodulation section 114, subjected to delay detection processing and compared with the signal one bit ahead by determination section 115 to become a demodulated signal.

As shown above, since the OFDM communication apparatus of the present embodiment has the inverted symbol, which is the inverted phase reference symbol, inserted immediately after the phase reference symbol used for delay detection, making it possible to cancel out and reduce correlation output near the synchronization timing position. Therefore, the OFDM communication apparatus of the present embodiment can suppress a correlation value exceeding a threshold even if signals with high power are included. As a result, the OFDM communication apparatus of the present embodiment can accurately detect FFT processing start timing and prevent desynchronization.

(Embodiment 6)

The present embodiment explains a case where an inverted signal of a shorter interval than the cycle of the phase reference symbol is inserted immediately after the phase reference symbol.

Figure 13:
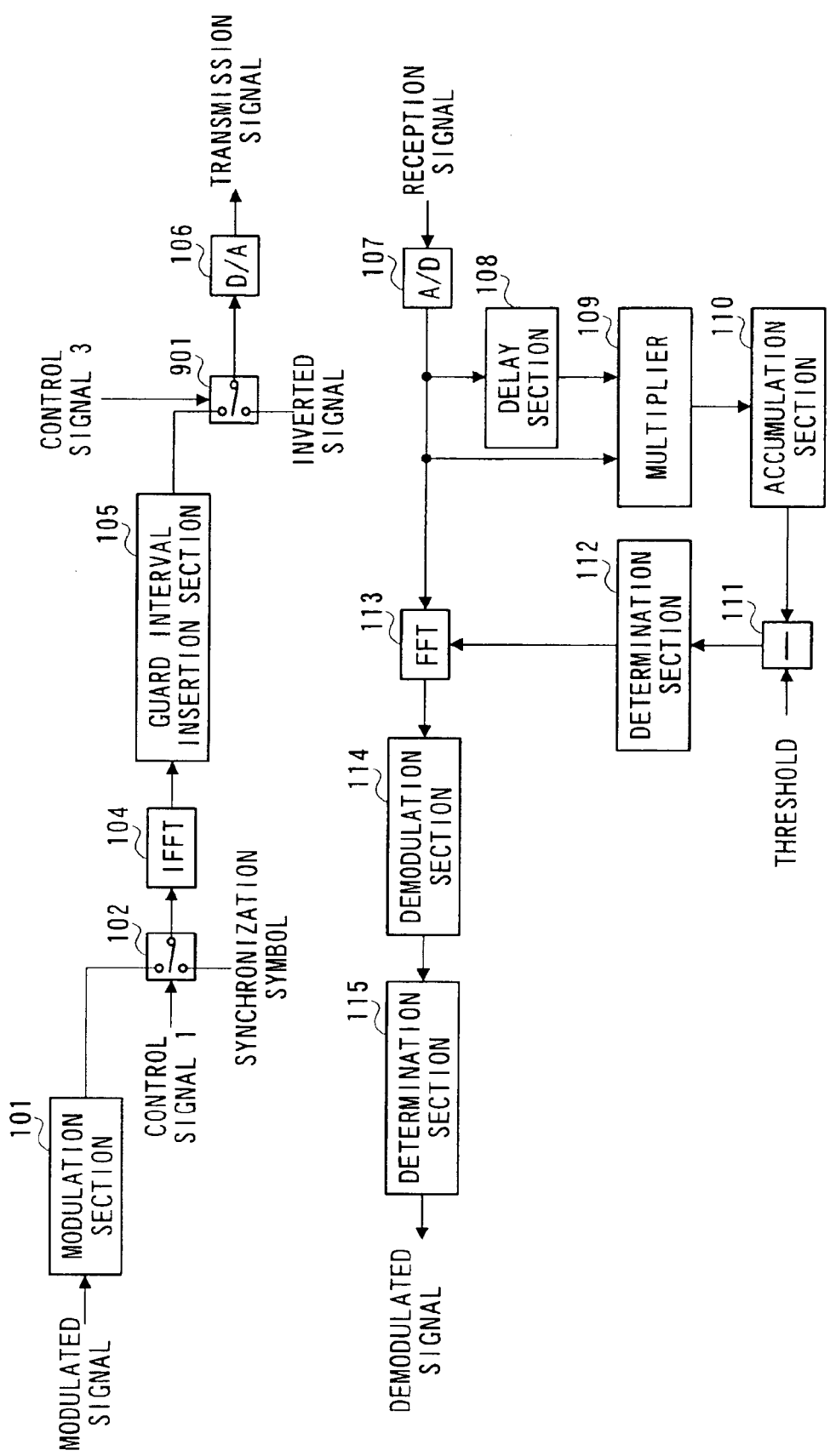
FIG. 13 is a block diagram showing a configuration of an OFDM communication apparatus according to Embodiment 6 of the present invention.

FIG. 13 is a block diagram showing a configuration of the OFDM communication apparatus according to Embodiment 6 of the present invention. In FIG. 13, the same parts as those in FIG. 11 are assigned the same codes as those in FIG. 11 and their detailed explanations are omitted.

In the OFDM communication apparatus shown in FIG. 13, the transmission section carries out IFFT processing on the signal with a synchronization symbol inserted and inserts a guard interval and then inserts an inverted signal. Therefore, inverted symbol insertion section 701 is removed and inverted signal insertion section 901 is provided after guard interval insertion section 105.

Figure 14:
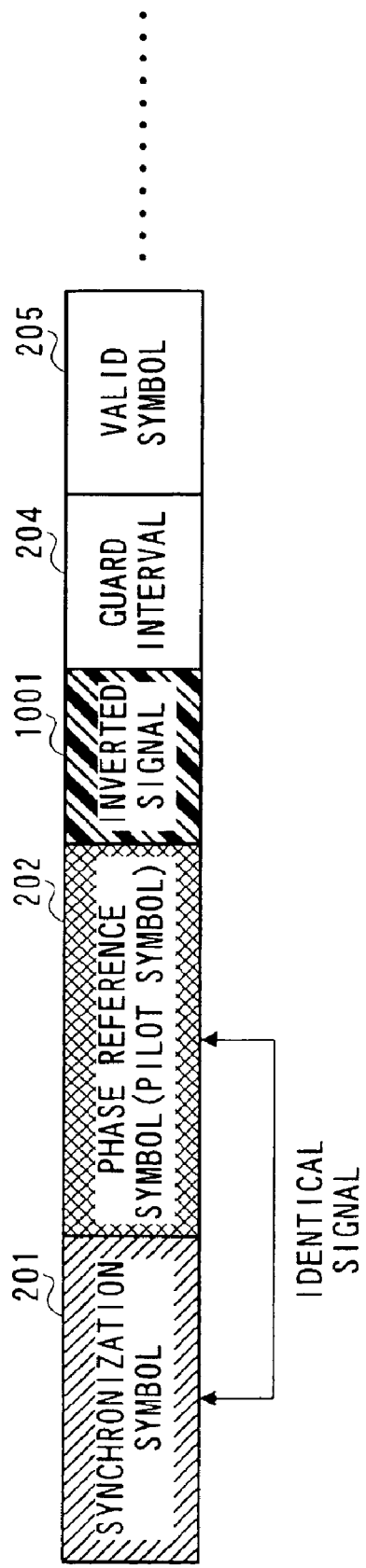
FIG. 14 is a frame chart of a signal used by the OFDM communication apparatus according to the embodiment above.

Then, the operation of the OFDM communication apparatus with the above configuration is explained using FIG. 13 and FIG. 14. Synchronization symbol 201 is inserted by synchronization symbol insertion section 102 into the signal digital-modulated by modulation section 101 as in the case of Embodiment 1. Phase reference symbol 202 is inserted after synchronization symbol 201. This phase reference symbol 202 is identical to synchronization symbol 201. This phase reference symbol 202 is inserted by synchronization symbol insertion section 102 in like manner.

The signal with synchronization symbol 201 inserted is sent to IFFT section 104 to be subjected to an IFFT calculation. Then, guard interval 204 is inserted into the IFFT-transformed signal waveform by guard interval insertion section 105.

Then, an inverted signal, which is a correlation value suppression signal, is inserted into the signal with the guard interval inserted by inverted signal insertion section 901. This inverted signal insertion section 901 is made up of a switch and when control signal 3 instructing inverted signal 1001 to be inserted is input, this switch is switched to insert inverted signal 1001. The interval of this inverted signal 1001 is set to be shorter than the cycle of phase reference symbol 202. For example, it is preferable to set the interval to approximately ¼ symbol. This minimizes the interval during which signals without power are sent.

Then, the signal with such an inverted signal inserted is D/A-converted by D/A converter 106. Then, the D/A-converted signal is subjected to normal transmission processing and then transmitted. That is, the above signal is frequency-converted and amplified by a radio transmission section, which is not shown in the figure, and transmitted from an antenna.

On the other hand, a signal received from an antenna is subjected to normal radio reception processing. For the baseband signal, symbol synchronization is established using a guard interval as in the case of Embodiment 1.

As shown in FIG. 14, the present embodiment has inverted signal 1001 inserted after phase reference symbol 202 in a signal frame. Therefore, under circumstances under which tens of delay signals are received, if signals with high signal power are included, correlation processing is carried out between the inverted signal of the reception signal and the phase reference symbol when a correlation is found between the reception signal and the signal delayed by one symbol. In this case, since correlation processing is performed with the inverted signal, both signals cancel out each other and the correlation result becomes very small no matter how high the signal power may be. For this reason, a peak exceeding a threshold is identified near the FFT processing start timing, thus making it possible to accurately detect the FFT processing start timing.

The A/D-converted baseband signal is subjected to FFT processing at the FFT processing start timing above in FFT section 113 to obtain signals assigned to their respective subcarriers. These signals are further sent to demodulation section 114, subjected to delay detection processing, and compared with the signal one bit ahead by determination section 115 to become a demodulated signal.

As shown above, since the OFDM communication apparatus of the present embodiment has the inverted signal inserted immediately after the phase reference symbol used for delay detection, making it possible to reduce correlation output near the synchronization timing position. Therefore, the OFDM communication apparatus of the present embodiment can suppress a correlation value exceeding a threshold even if signals with high power are included. As a result, the OFDM communication apparatus of the present embodiment can accurately detect FFT processing start timing and prevent desynchronization. Furthermore, since the inverted signal inserted immediately after the phase reference symbol is shorter than the phase reference symbol cycle, thus minimizing the interval during which signals without power are sent.

(Embodiment 7)

The present embodiment explains a case where the interval into which an inverted signal is inserted is made variable.

Figure 15:
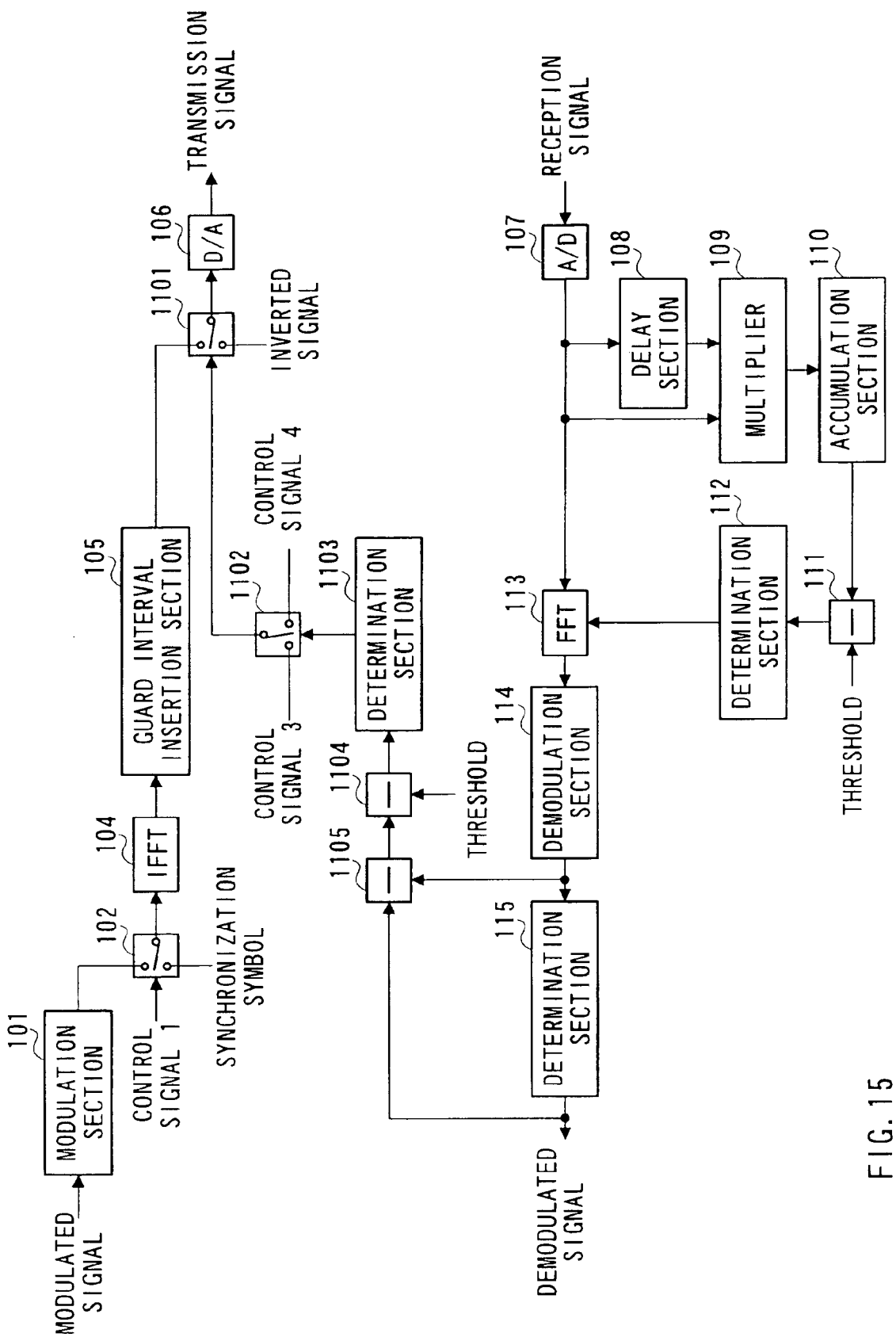
FIG. 15 is a block diagram showing a configuration of an OFDM communication apparatus according to Embodiment 7 of the present invention.

FIG. 15 is a block diagram showing a configuration of the OFDM communication apparatus according to Embodiment 7 of the present invention. In FIG. 15, the same parts as those in FIG. 10 are assigned the same codes as those in FIG. 10 and their detailed explanations are omitted.

The OFDM communication apparatus shown in FIG. 15 includes first subtraction section 1105 that calculates a difference between signals before and after judgment by determination section 115, second subtraction section 1104 that calculates a difference between this subtraction result and a predetermined threshold, determination section 1103 that judges whether the subtraction result of the second subtraction section is larger or smaller, switch 1102 that selects whether or not to insert an inverted signal according to this determination result and inverted signal insertion section 1101 that inserts an inverted signal immediately after the phase reference symbol.

Inverted signal insertion section 1101 is made up of a switch and when control signal 3 instructing an inverted signal to be inserted is input to switch 1102, this switch is switched to insert the inverted signal. Switch 1102 is switched through control signal 3 instructing the inverted signal to be inserted and control signal 4 instructing the inverted signal not to be inserted according to the judgment result of determination section 1103.

Then, the operation of the OFDM communication apparatus with the above configuration is explained using FIG. 15. Synchronization symbol 201 is inserted by synchronization symbol insertion section 102 into the signal digital-modulated by modulation section 101 as in the case of Embodiment 1. Phase reference symbol 202 is inserted after synchronization symbol 201.

The signal with synchronization symbol.201 inserted is sent to IFFT section 104 and subjected to an IFFT calculation. Then, guard interval 204 is inserted into the IFFT-transformed signal waveform by guard interval insertion section 105.

On the other hand, a signal received from an antenna is subjected to normal radio reception processing. For the baseband signal, symbol synchronization is established using a guard interval as in the case of Embodiment 1.

As shown in FIG. 14, the present embodiment has inverted signal 1101 inserted after phase reference symbol 202 in a signal frame. Therefore, correlation processing is carried out between the inverted signal of the reception signal and the phase reference symbol when a correlation is found between the reception signal and the signal delayed by one symbol.

The A/D-converted baseband signal is subjected to FFT processing at the FFT processing start timing above in FFT section 113 to obtain signals assigned to their respective subcarriers. These signals are sent to demodulation section 114, subjected to delay detection processing and compared with the signal one bit ahead by determination section 115 to become a demodulated signal.

In the case above, signals before and after judgment are sent to first subtraction section 1105 where the difference between the two signals is found. This difference is sent to second subtraction section 1104 and compared with a threshold. This comparison result is judged by determination section 1103. If the difference is larger than this threshold, determination section 1103 judges that the communication environment is ill conditioned, that is, the interval of the inverted signal is short and controls so as to lengthen the interval of the inverted signal.

More specifically, to lengthen the interval of the inverted signal, control signal 3 is input to switch 1102 so that switch 1102 is switched and the inverted signal is inserted by inverted signal insertion section 1101. On the other hand, if there is no need to lengthen the inverted signal, control signal 4 is input to switch 1102 so that switch 1102 is switched preventing inverted signal insertion section 1101 from inserting the inverted signal. Thus, it is possible to adaptively change the interval of the inverted signal in the signal frame.

Then, the signal with the inverted signal inserted is D/A-converted by D/A converter 106. Then, the D/A-converted signal is subjected to normal radio transmission processing and then transmitted. That is, the above signal is frequency-converted and amplified by a radio transmission section, which is not shown in the figure, and transmitted from an antenna.

As shown above, the OFDM communication apparatus of the present embodiment inserts the inverted signal immediately after the phase reference symbol used for delay detection, reducing the correlation output near the synchronization timing position, making it possible to accurately detect the FFT processing start timing and prevent desynchronization. Furthermore, the OFDM communication apparatus of the present embodiment can switch whether or not to insert the inverted signal, making it possible to adaptively change the interval of the inverted signal in a signal frame and flexibly adapt to the communication environment.

(Embodiment 8)

The present embodiment explains a case where the level of an inverted signal inserted immediately after the phase reference symbol is increased.

Figure 16:
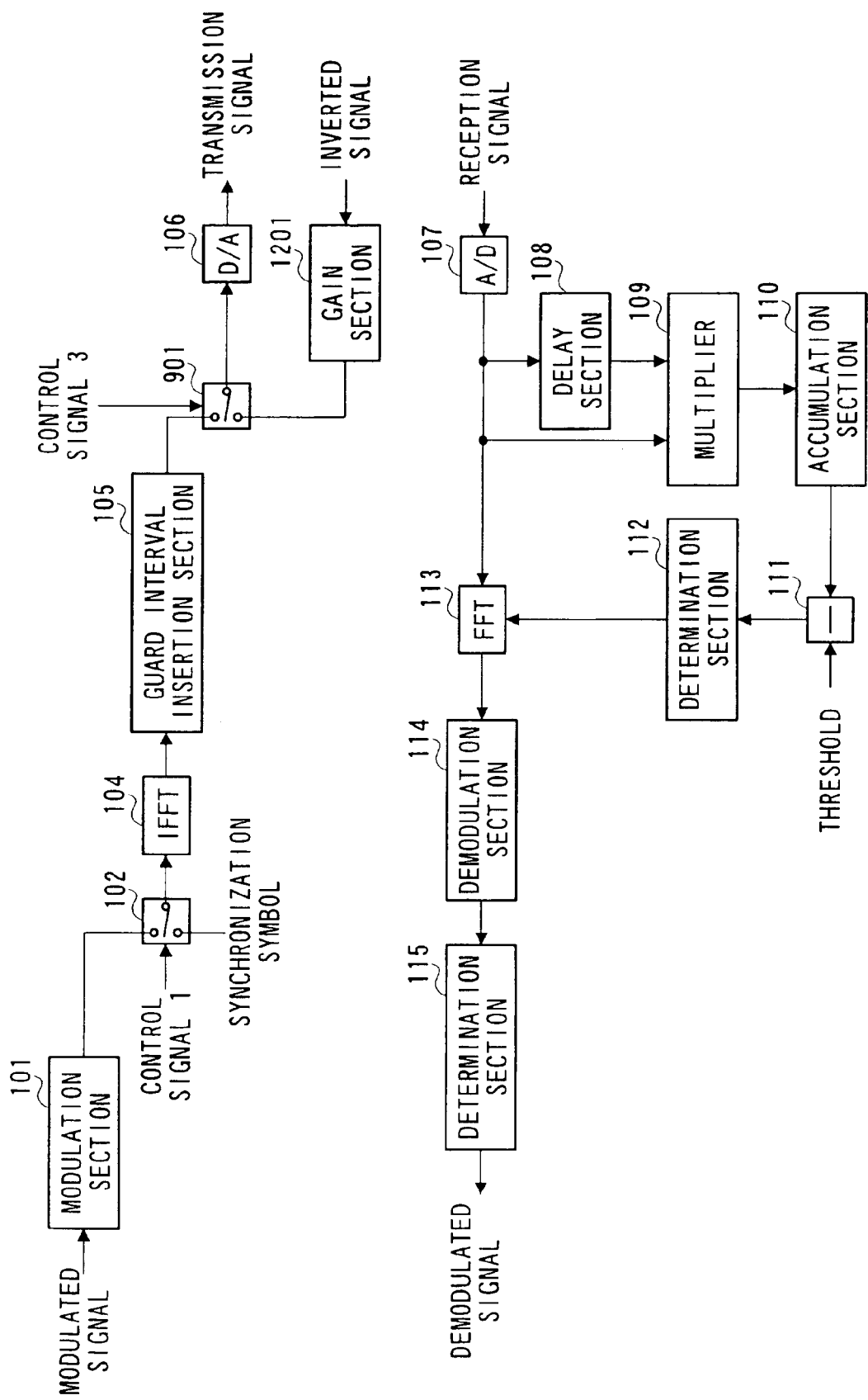
FIG. 16 is a block diagram showing a configuration of an OFDM communication apparatus according to Embodiment 8 of the present invention.

FIG. 16 is a block diagram showing a configuration of the OFDM communication apparatus according to Embodiment 8 of the present invention. In FIG. 16, the same parts as those in FIG. 13 are assigned the same codes as those in FIG. 13 and their detailed explanations are omitted.

In the OFDM communication apparatus shown in FIG. 16, the transmission section carries out IFFT processing on the signal with a synchronization symbol inserted and inserts a guard interval and then inserts an inverted signal. At this time, gain section 1201 is provided to increase the level of the inverted signal.

Then, the operation of the OFDM communication apparatus with the above configuration is explained using FIG. 16. Synchronization symbol 201 is inserted by synchronization symbol insertion section 102 into the signal digital-modulated by modulation section 101 as in the case of Embodiment 1. Phase reference symbol 202 is inserted after synchronization symbol 201. This phase reference symbol 202 is identical to synchronization symbol 201. This phase reference symbol 202 is inserted by synchronization symbol insertion section 102 in like manner.

The signal with synchronization symbol 201 inserted is sent to IFFT section 104 to be subjected to an IFFT calculation. Then, guard interval 204 is inserted into the IFFT-transformed signal waveform by guard interval insertion section 105.

Then, an inverted signal is inserted into the signal with the guard interval inserted by inverted signal insertion section 901. The level of this inverted signal is increased by gain section 1201. The gain level is set according to the communication environment and the number of delay signals, etc. as appropriate.

Then, the signal with such an inverted signal inserted is D/A-converted by D/A converter 106. Then, the D/A-converted signal is subjected to normal transmission processing and then transmitted. That is, the above signal is frequency-converted and amplified by a radio transmission section, which is not shown in the figure, and transmitted from an antenna.

On the other hand, a signal received from an antenna is subjected to normal radio reception processing. For the baseband signal, symbol synchronization is established using a guard interval as in the case of Embodiment 1.

As shown in FIG. 14, the present embodiment has inverted signal 1001 inserted after phase reference symbol 202 in a signal frame. Therefore, under circumstances under which tens of delay signals are received, if signals with high signal power are included, correlation processing is carried out between the inverted signal of the reception signal and the phase reference symbol when a correlation is found between the reception signal and the signal delayed by one symbol. In this case, since the level of the inverted signal Is increased, both signals cancel out each other and the correlation result becomes very small no matter how high the signal power may be. For this reason, a peak exceeding a threshold is identified near the FFT processing start timing, thus making it possible to accurately detect the FFT processing start timing.

The A/D-converted baseband signal is subjected to FFT processing at the FFT processing start timing above in FFT section 113 to obtain signals assigned to their respective subcarriers. These signals are further sent to demodulation section 114, subjected to delay detection processing and compared with the signal one bit ahead by determination section 115 to become a demodulated signal.

As shown above, since the OFDM communication apparatus of the present embodiment has an inverted signal with high gain inserted immediately after the phase reference symbol used for delay detection, making it possible to reduce correlation output near the synchronization timing position. Therefore, the OFDM communication apparatus of the present embodiment can suppress a correlation value exceeding a threshold even if signals with high power are included. As a result, the OFDM communication apparatus of the present embodiment can accurately detect FFT processing start timing and prevent desynchronization.

(Embodiment 9)

The present embodiment explains a case where the gain of an inverted signal is made variable.

Figure 17:
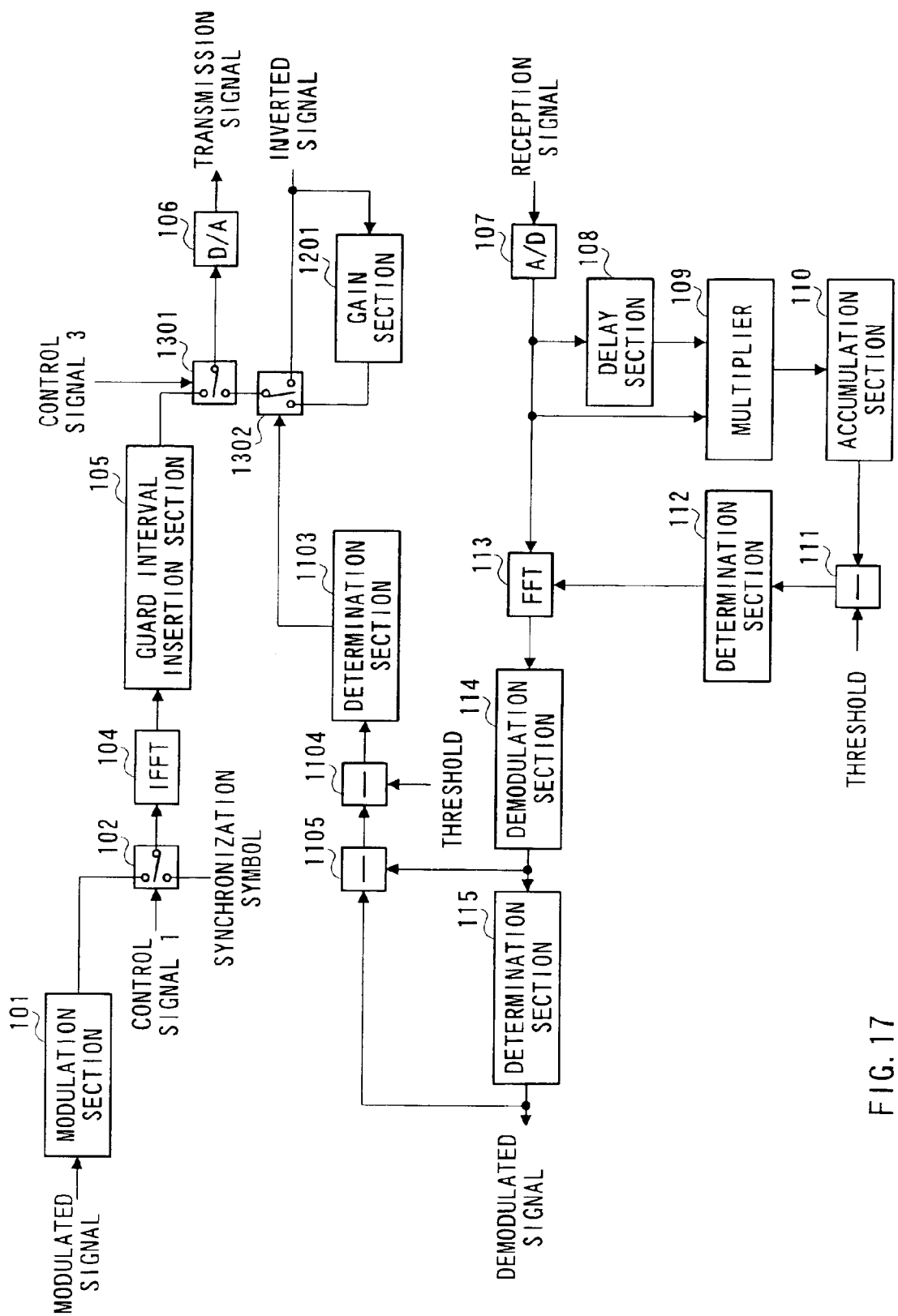
FIG. 17 is a block diagram showing a configuration of an OFDM communication apparatus according to Embodiment 9 of the present invention.

FIG. 17 is a block diagram showing a configuration of the OFDM communication apparatus according to Embodiment 9 of the present invention. In FIG. 17, the same parts as those In FIG. 15 are assigned the same codes as those in FIG. 15 and their detailed explanations are omitted.

The OFDM communication apparatus shown in FIG. 17 includes first subtraction section 1105 that calculates a difference between signals before and after judgment by determination section 115, second subtraction section 1104 that calculates a difference between this subtraction result and a predetermined threshold, determination section 1103 that judges whether the subtraction result of the second subtraction section is larger or smaller, switch 1302 that changes the gain of the inverted signal according to this determination result, inverted signal insertion section 1301 that inserts an inverted signal immediately after the phase reference symbol and gain section 1201 that changes the level of the inverted signal.

Inverted signal insertion section 1301 is made up of a switch and when control signal 3 instructing an inverted signal to be inserted is input, this switch is switched to insert the inverted signal. Switch 1302 changes the gain of the inverted signal based on the determination result of determination section 1103.

Then, the operation of the OFDM communication apparatus with the above configuration is explained using FIG. 17. Synchronization symbol 201 is inserted by synchronization symbol insertion section 102 into the signal digital-modulated by modulation section 101 as in the case of Embodiment 1. Phase reference symbol 202 is inserted after synchronization symbol 201.

The signal with synchronization symbol 201 inserted is sent to IFFT section 104 and subjected to an IFFT calculation. Then, guard interval 204 is inserted into the IFFT-transformed signal waveform by guard interval insertion section 105.

On the other hand, a signal received from an antenna is subjected to normal radio reception processing. For the baseband signal, symbol synchronization is established using a guard interval as in the case of Embodiment 1.

As shown in FIG. 14, the present embodiment has inverted signal 1001 inserted after phase reference symbol 202 in a signal frame. Therefore, correlation processing is carried out between the inverted signal of the reception signal and the phase reference symbol when a correlation is found between the reception signal and the signal delayed by one symbol.

The A/D-converted baseband signal is subjected to FFT processing at the FFT processing start timing above in FFT section 113 to obtain signals assigned to their respective subcarriers. These signals are sent to demodulation section 114, subjected to delay detection processing and compared with the signal one bit ahead by determination section 115 to become a demodulated signal.

In the case above, signals before and after judgment are sent to first subtraction section 1105 where the difference between the two signals is found. This difference is sent to second subtraction section 1104 and compared with a threshold. This comparison result is judged by determination section 1103. If the difference is larger than this threshold, determination section 1103 judges that the communication environment is ill conditioned, that is, the level of the inverted signal is low and controls so as to increase the level of the inverted signal.

More specifically, to increase the level of the inverted signal, switch 1302 is switched to send the inverted signal whose level has been increased by gain section 1201 to inverted signal insertion section 1301 and insert a high level inverted signal there. On the other hand, if there is no need to increase the level of the inverted signal, switch 1302 is switched to send the inverted signal of that level to inverted signal insertion section 1301 and insert the inverted signal there. In this way, the level of the inverted signal can be changed adaptively in a signal frame.

Then, the signal with the inverted signal inserted in this way is D/C-converted by D/A conversion section 106. Then, the D/A-converted signal is subjected to normal radio transmission processing and then transmitted. That is, the signal above is frequency-converted and amplified by a radio transmission section, which is not shown in the figure, and transmitted from an antenna.

As shown above, the OFDM communication apparatus of the present embodiment has an inverted signal inserted immediately after the phase reference symbol used for delay detection making it possible to reduce correlation output near the synchronization timing position., accurately detect FFT processing start timing and prevent desynchronization. Moreover, the OFDM communication apparatus of the present embodiment can adaptively make the level of the inverted signal variable by switching between the levels of the inverted signal, thus flexibly responding to the communication environment.

(Embodiment 10)

The present embodiment explains a case where the gain of an inverted signal is made variable using average reception quality information.

Figure 18:
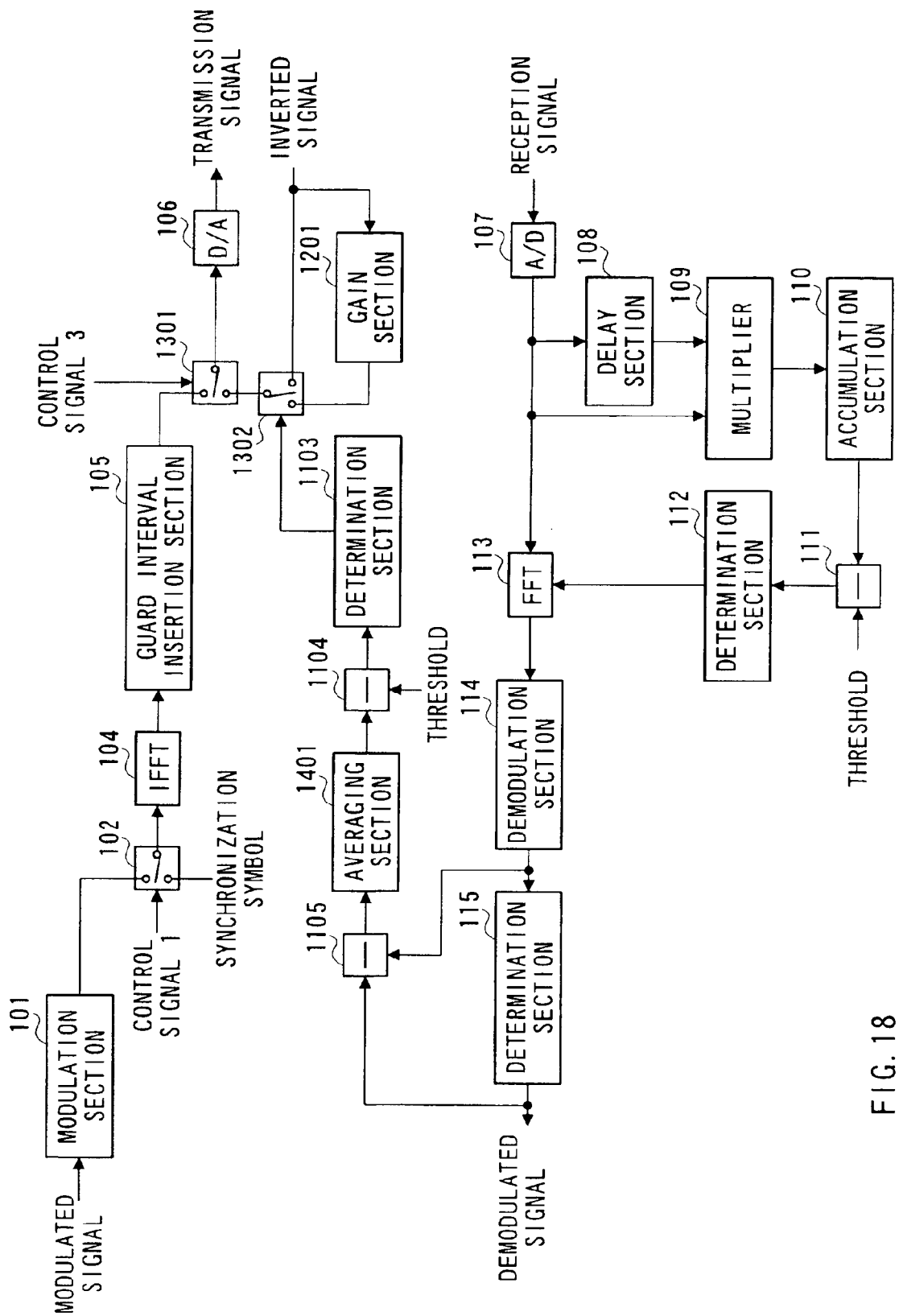
FIG. 18 is a block diagram showing a configuration of an OFDM communication apparatus according to embodiment 10 of the present invention.

FIG. 18 is a block diagram showing a configuration of the OFDM communication apparatus according to Embodiment 10 of the present invention. In FIG. 18, the same parts as those in FIG. 17 are assigned the same codes as those in FIG. 17 and their detailed explanations are omitted.

The OFDM communication apparatus shown in FIG. 18 includes averaging section 1401 that calculates a burst average of the subtraction result of first subtraction section 1105 that calculates a difference between signals before and after judgment in determination section 115.

This averaging section 1401 averages bursts of first subtraction section 1105 preventing the gain of the inverted signal from being increased when a threshold is exceeded suddenly. This allows interference with others to be reduced.

Then, the operation of the OFDM communication apparatus with the above configuration is explained using FIG. 18. Synchronization symbol 201 is inserted by synchronization symbol insertion section 102 into the signal digital-modulated by modulation section 101 as in the case of Embodiment 1. Phase reference symbol 202 is inserted after synchronization symbol 201.

The signal with synchronization symbol 201 inserted is sent to IFFT section 104 and subjected to an IFFT calculation. Then, guard interval 204 is inserted into the IFFT-transformed signal waveform by guard interval insertion section 105.

On the other hand, a signal received from an antenna is subjected to normal radio reception processing. For the baseband signal, symbol synchronization is established using a guard interval as in the case of Embodiment 1.

As shown in FIG. 14, the present embodiment has inverted signal 1001 inserted after phase reference symbol 202 in a signal frame. Therefore, correlation processing is carried out between the inverted signal of the reception signal and the phase reference symbol when a correlation is found between the reception signal and the signal delayed by one symbol.

The A/D-converted baseband signal is subjected to FFT processing at the FFT processing start timing above in FFT section 113 to obtain signals assigned to their respective subcarriers. These signals are further sent to demodulation section 114, subjected to delay detection processing and compared with the signal one bit ahead by determination section 115 to become a demodulated signal.

In the case above, signals before and after judgment are sent to first subtraction section 1105 where the difference between the two signals is found. This difference is sent to averaging section 1401 where a burst average is calculated. This averaging result is sent to second subtraction section 1104 and compared with a threshold. This comparison result is judged by determination section 1103. If the difference is larger than this threshold, determination section 1103 judges that the communication environment is ill conditioned, that is, the level of the inverted signal is low and controls so as to increase the level of the inverted signal.

More specifically, to increase the level of the inverted signal, switch 1302 is switched to send the inverted signal whose level has been increased by gain section 1201 to inverted signal insertion section 1301 and the high-level inverted signal is inserted there. On the other hand, if there is no need to increase the level of the inverted signal, switch 1302 is switched to send the inverted signal of the same level to inverted signal insertion section 1301 and insert the inverted signal there. Thus, it is possible to adaptively make the level of the inverted signal variable in the signal frame.

Then, the signal with the inverted signal inserted in this way is D/A-converted by D/A converter 106. Then, the D/A-converted signal is subjected to normal radio transmission processing and then transmitted. That is, the above signal is frequency-converted and amplified by a radio transmission section, which is not shown in the figure, and transmitted from an antenna.

As shown above, the OFDM communication apparatus of the present embodiment has an inverted signal inserted immediately after the phase reference symbol used for delay detection making it possible to reduce correlation output near the synchronization timing position, accurately detect FFT processing start timing and prevent desynchronization. Moreover, the OFDM communication apparatus of the present embodiment can adaptively make the level of the inverted signal variable by switching between the levels of the inverted signal, thus flexibly responding to the communication environment. In this case, since bursts of first subtraction section 1105 are averaged, it is possible to prevent the gain of the inverted signal from being increased when a threshold is exceeded suddenly. This allows interference with others to be reduced.

(Embodiment 11)

Figure 19:
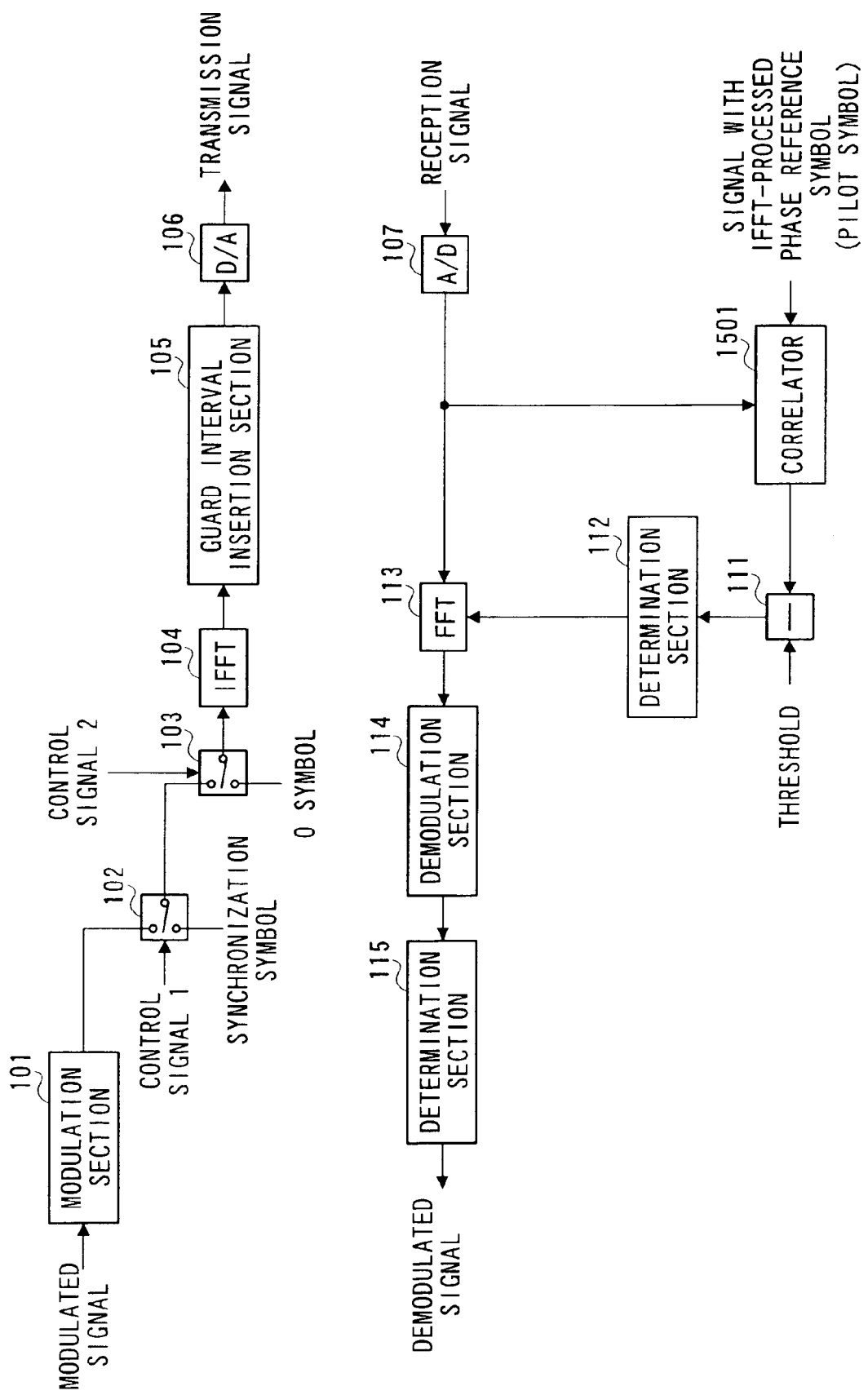
FIG. 19 is a block diagram showing a configuration of an OFDM communication apparatus according to Embodiment 11 of the present invention.

The present embodiment explains a case where a synchronization pull-in method, which is different from the above described embodiments, is used with reference to FIG. 19. As the synchronization pull-in method, in addition to a method of detecting a maximum value of the result of a correlation between the reception signal and this reception signal delayed by one symbol (the method in the above embodiments), there is another method of detecting a maximum value of the result of a correlation between a signal with an IFFT-processed phase reference symbol (pilot symbol) and the reception signal. The OFDM communication apparatus of the present embodiment uses this synchronization pull-in method. Here, a case where this synchronization pull-in method is used in the OFDM communication apparatus according to Embodiment 1 is explained as an example.

FIG. 19 is a block diagram showing a configuration of the OFDM communication apparatus according to Embodiment 11 of the present invention. In FIG. 19, the same parts as those in FIG. 5 are assigned the same codes as those in FIG. 5 and their detailed explanations are omitted.

In the OFDM communication apparatus shown in FIG. 19, the reception section includes correlator 1501 that calculates a correlation between the signal with an IFFT-processed phase reference symbol (pilot symbol) and the reception signal. The internal configuration of this correlator 1501 is explained using FIG. 20.

Figure 20:
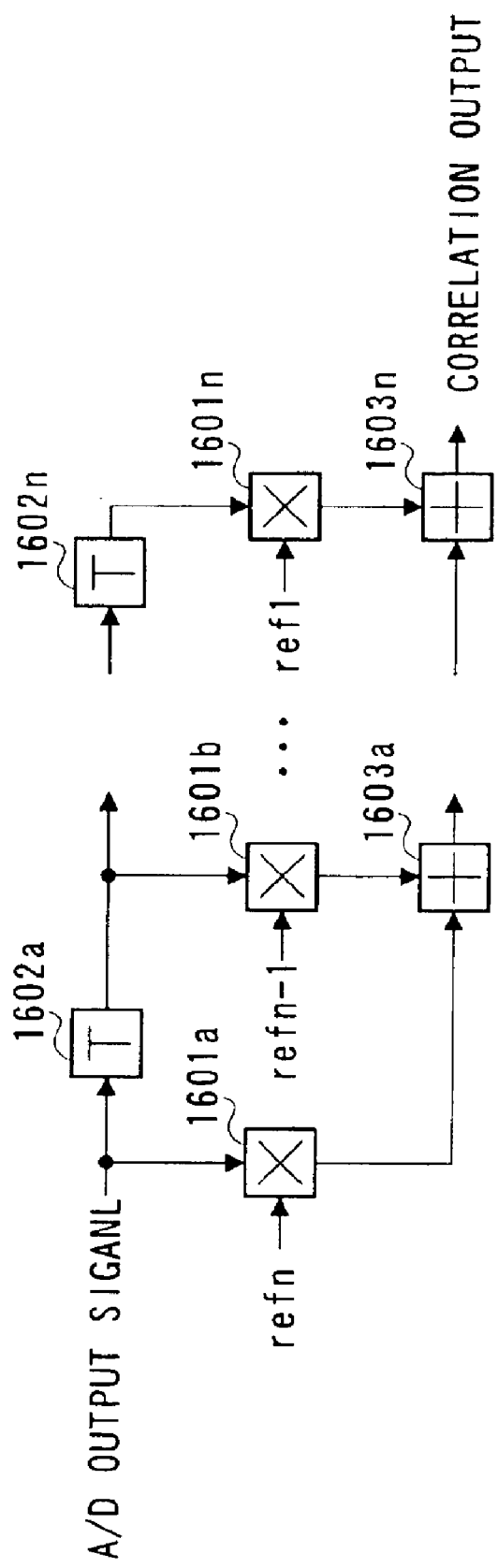
FIG. 20 is a block diagram showing an internal configuration of a correlator of the OFDM communication apparatus according to Embodiment 11.

FIG. 20 is a block diagram showing the internal configuration of correlator 1501 in the OFDM communication apparatus according to Embodiment 11. As shown in FIG. 20, the signal output from A/D converter 107 (reception signal) and a signal with an IFFT processed phase reference symbol are input to correlator 1501. More specifically, if the number of samples in IFFT processing is n, signals at the first to nth sample points (real to ref in the figure) obtained by IFFT-processing the phase reference symbol are input to correlator 1501.

Furthermore, as shown in FIG. 20, correlator 1501 includes multipliers 1601a to 1601n, delayers 1602a to 1602n and adders 1603a to 1603n. Correlator 1501 with the above configuration calculates a value of a correlation between the reception signal and the signal with an IFFT-processed phase reference symbol from adder 1603n.

The correlation value output from correlator 1501 is sent to subtraction section 111 and subjected to the same processing as that explained in Embodiment 1. In this way, synchronization pull-in processing is carried out.

In the present embodiment, as shown in FIG. 6, 0 symbol 203 is inserted after phase reference symbol 202 in a signal frame. Therefore, under circumstances under which tens of delay signals are received and signals with high power are included, correlation processing is carried out between the 0 symbol of the reception signal and the signal with an IFFT-processed phase reference symbol when a correlation is found between the signal with an IFFT-processed phase reference symbol and the reception signal. In this case, since correlation processing is performed with the 0 symbol, the correlation result becomes very small no matter how high the signal power may be. For this reason, a peak exceeding a threshold is identified near the FFT processing start timing, thus making it possible to accurately detect the FFT processing start timing.

As shown above, since the OFDM communication apparatus of the present embodiment has a 0 symbol inserted immediately-after the phase reference symbol used for synchronization pull-in processing, making it possible to reduce correlation output near the synchronization timing position. Therefore, the OFDM communication apparatus of the present embodiment can suppress a correlation value exceeding a threshold even if signals with high power are included. As a result, the present embodiment can accurately detect FFT processing start timing and prevent desynchronization.

The present embodiment explains the case where the synchronization pull-in method above is used for the OFDM communication apparatus according to Embodiment 1, but the present invention is also applicable to cases where the synchronization pull-in method above is used for Embodiments 2 to 10.

(Embodiment 12)

Figure 21:
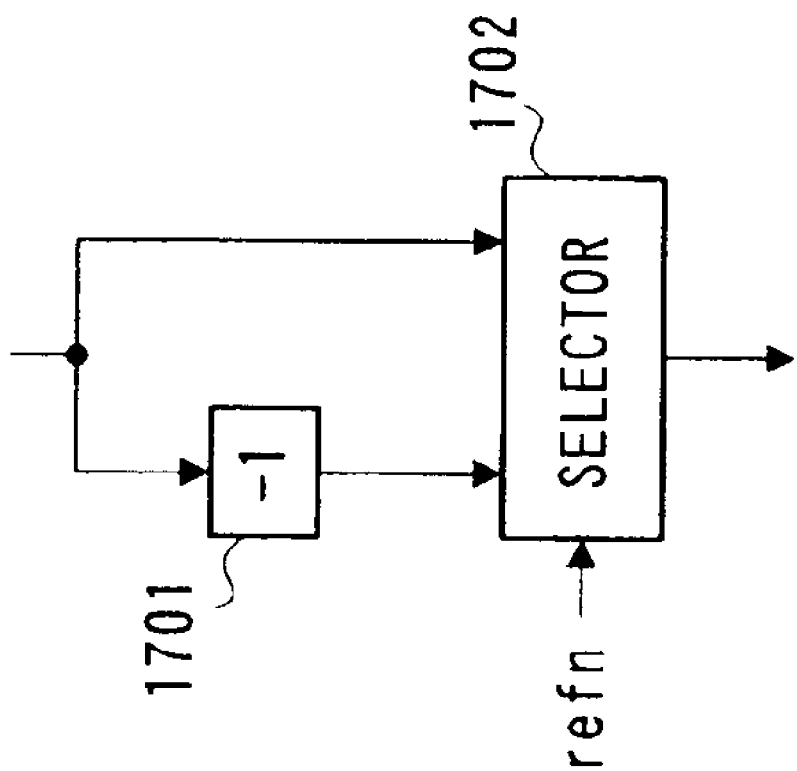
FIG. 21 is a block diagram showing a configuration of a hard decision section in a correlator of an OFDM communication apparatus according to Embodiment 12.

The present embodiment explains a case where a hard decision section is used for the IFFT-processed signal instead of a multiplier in the correlator that finds a correlation between the signal with an IFFT-processed phase reference symbol and the reception signal, with reference to FIG. 21.

FIG. 21 is a block diagram showing a configuration of a hard decision section in the OFDM communication apparatus according to Embodiment 12 of the present invention. The hard decision section shown in FIG. 21 is provided as a substitute for each of multipliers 1601a to 1601n in the correlator shown in FIG. 20. Hard decision section 1701 outputs a hard decision value for the signal (reception signal) output from A/D converter 107. Selector 1702 finds a correlation between the signal from hard decision section 1701, that is, a hard decision value, and the reception signal, that is, a soft decision value.

As shown above, the OFDM communication apparatus according to the present embodiment is equipped with a correlator configured without using any multiplier, and thus can drastically reduce the hardware scale.

(Embodiment 13)

Figure 1:
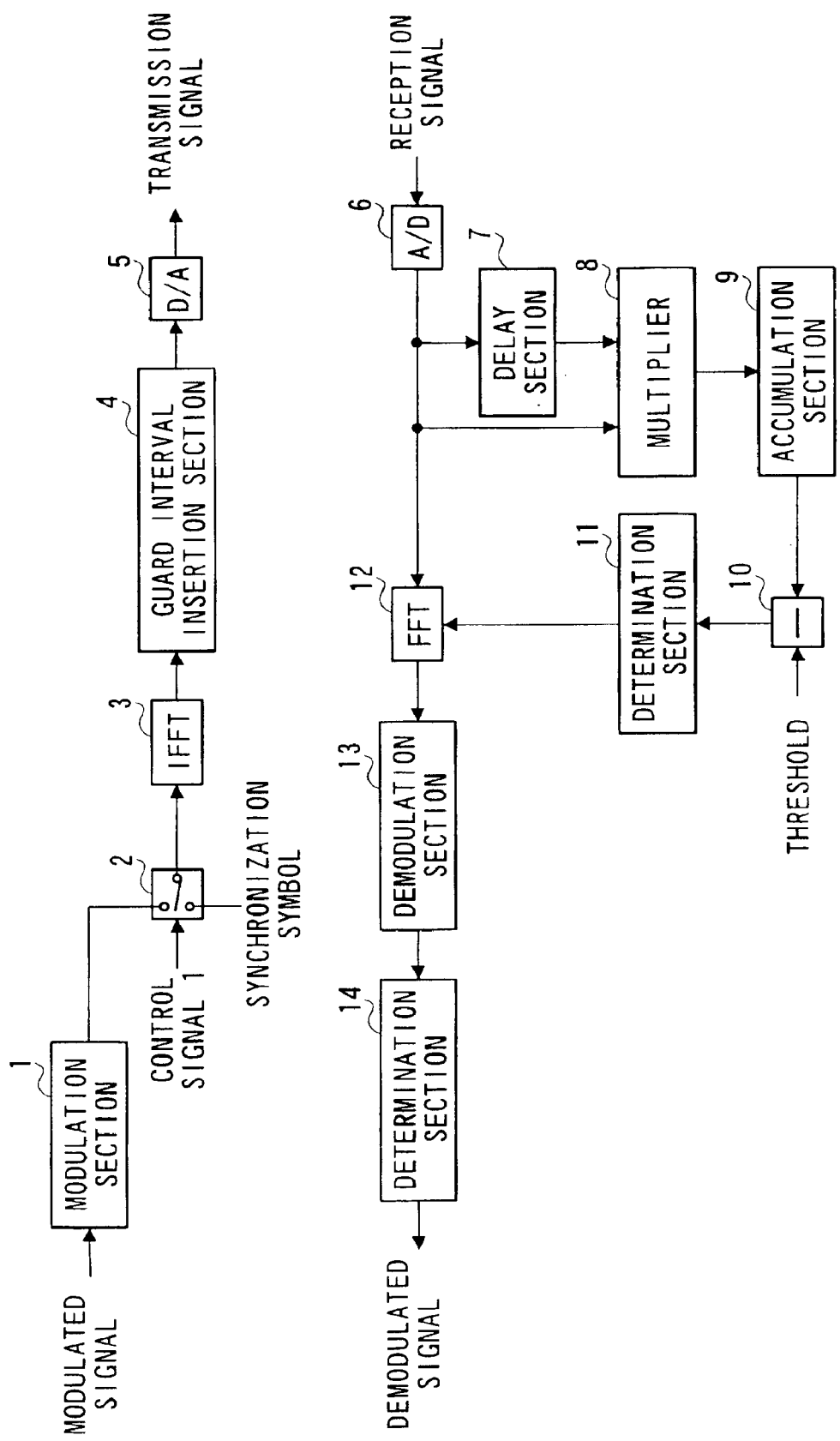
FIG. 1 is a block diagram showing a configuration of a conventional OFDM communication apparatus.
Figure 2:
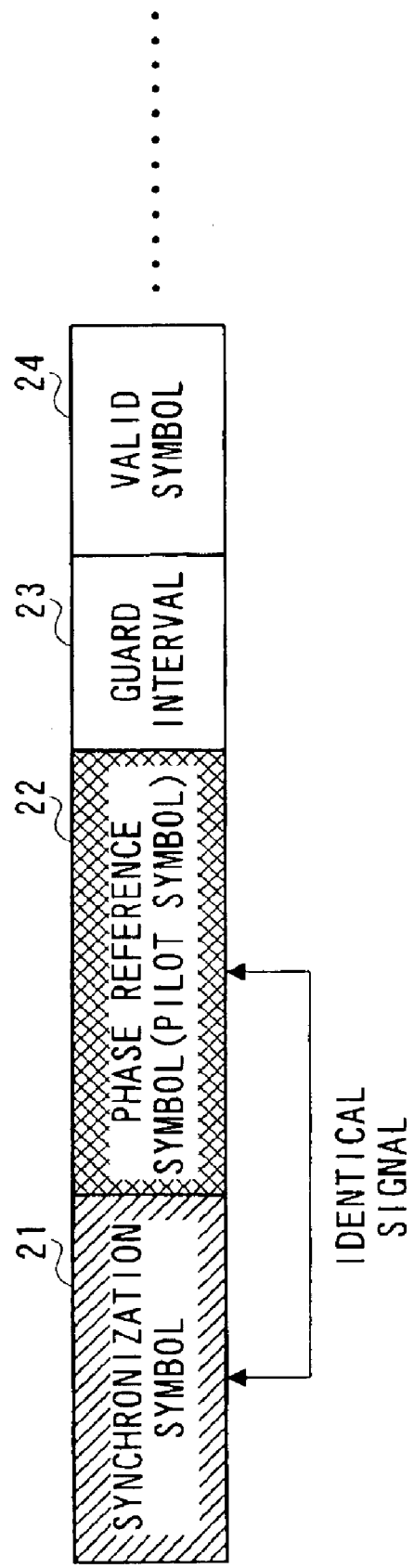
FIG. 2 is a frame chart of a signal used by the conventional OFDM communication apparatus.
Figure 4:
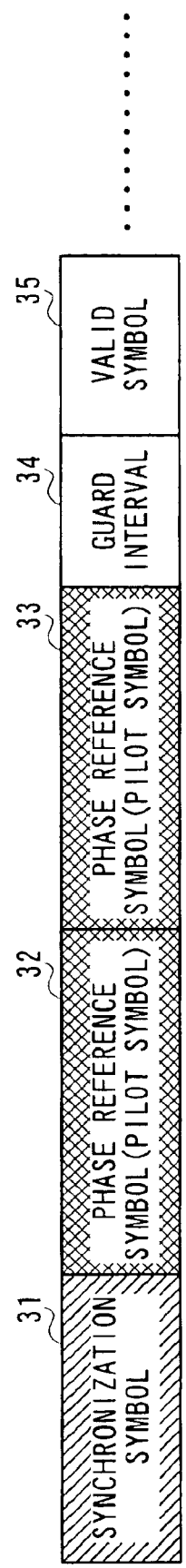
FIG. 4 is another frame chart used by the OFDM communication apparatus.
Figure 22:
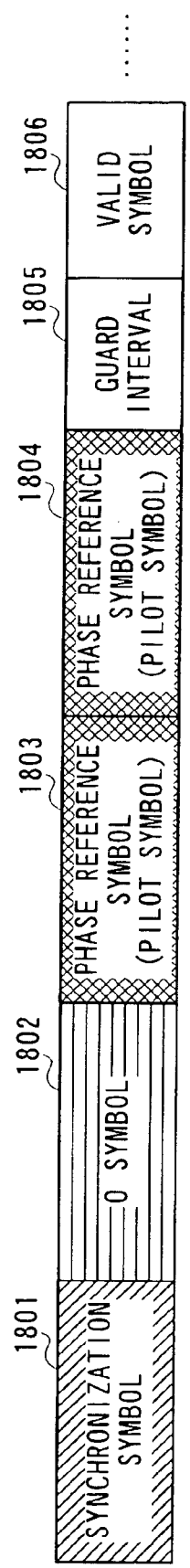
FIG. 22 is a frame diagram showing a signal used in an OFDM communication apparatus according to Embodiment 13.

The present embodiment explains a case where a synchronization pull-in method, which is different from the above two methods, is used, with reference to FIG. 22. In addition to the synchronization pull-in method using synchronization symbol 21 and phase reference symbol 22 in the frame above shown in FIG. 2, there is another synchronization pull-in method using the synchronization symbol in the frame shown in FIG. 4. The OFDM communication apparatus according to the present embodiment uses this synchronization pull-in method. Here, a case where this synchronization pull-in method is used in the OFDM communication apparatus according to Embodiment 1 is explained as an example with reference to Embodiment 12 and using FIG. 22.

FIG. 22 is a frame diagram of a signal used in the OFDM communication apparatus according to Embodiment 13 of the present invention. The frame shown in FIG. 22 is the frame shown in FIG. 4 with synchronization symbol 31 added immediately before the phase reference symbol 32. The OFDM communication apparatus according to the present embodiment uses a synchronization pull-in method that detects a maximum value of the result of a correlation between a signal with an IFFT-processed synchronization symbol in the frame shown in FIG. 22 and the reception signal.

Figure 23:
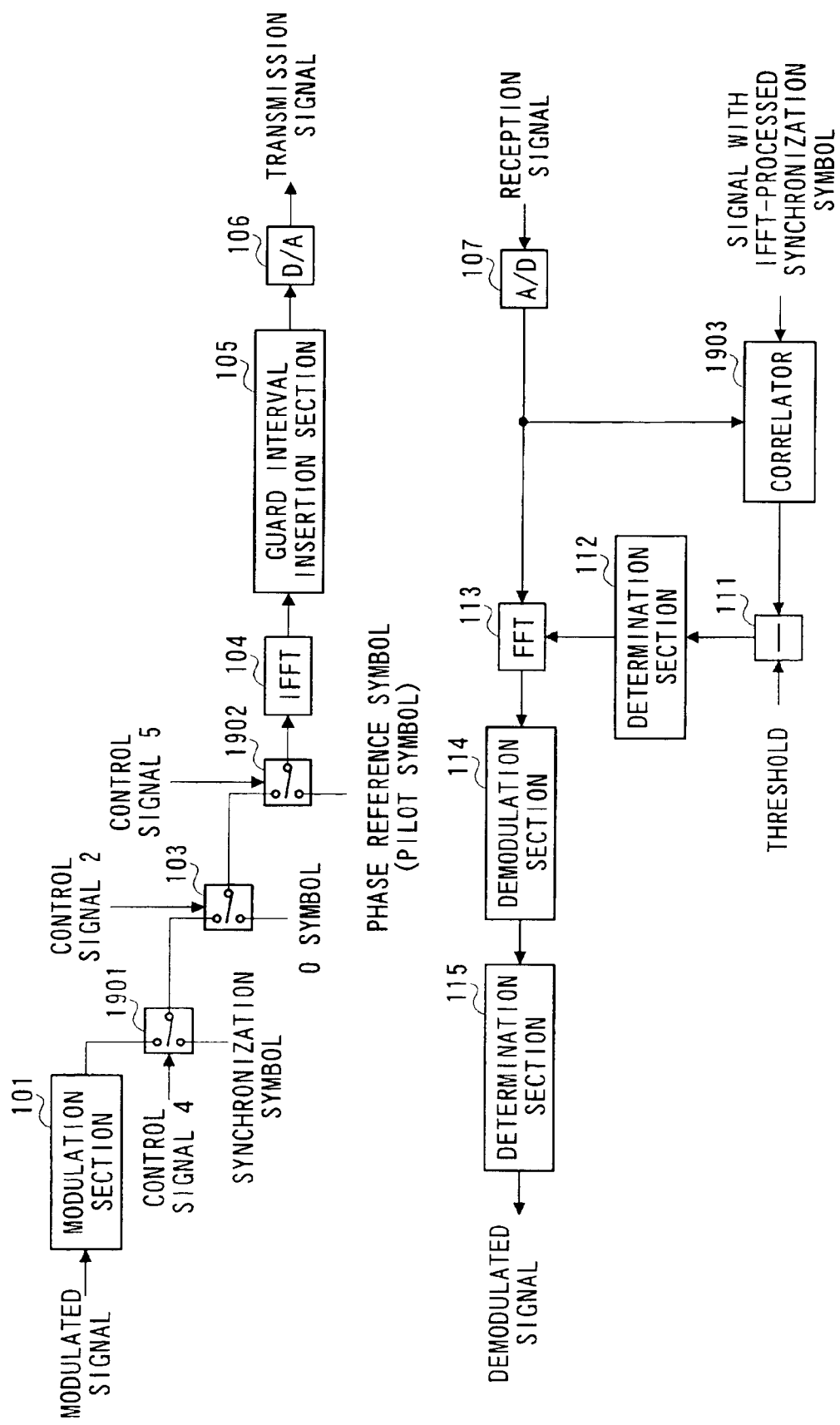
FIG. 23 is a block diagram showing a configuration of the OFDM communication apparatus according to Embodiment 13.

FIG. 23 is a block diagram showing a configuration of the OFDM communication apparatus according to Embodiment 13 of the present invention. In FIG. 23, the same parts as those in FIG. 5 are assigned the same codes as those in FIG. 5 and their detailed explanations are omitted.

In the transmission section, synchronization symbol insertion section 1901 inserts synchronization symbol 1801 into the signal digital-modulated by modulation section 101. This synchronization symbol insertion section 1901 is made up of a switch and when control signal 4 instructing synchronization symbol 1801 to be inserted is input, this switch is switched to insert synchronization symbol 1801.

0 symbol insertion section 103 inserts 0 symbol 1802 into the signal with synchronization symbol 1801 inserted. This 0 symbol insertion section 103 is the same as that in Embodiment 1.

Phase reference symbol insertion section 1902 inserts phase reference symbol 1803 and phase reference symbol 1804 into the signal with 0 symbol 1802 inserted. This phase reference symbol insertion section 1902 is made up of a switch and when control signal 5 instructing phase reference symbol 1803 and phase reference symbol 1804 to be inserted is input, this switch is switched to insert phase reference symbol 1803 and phase reference symbol 1804.

The signal with synchronization symbol 1801, 0 symbol 1802 and phase reference symbols above inserted is sent to IFFT section 104 and subjected to an IFFT calculation.

In the reception section, the signal (reception signal) output from A/D converter 107 is sent to FFT section 113 and correlator 1903. Correlator 1903 calculates a correlation value between the reception signal and a signal with an IFFT-processed synchronization symbol. This correlator 1903 is different from correlator 1501 in Embodiment 12 in that a signal with an IFFT-processed synchronization symbol is input instead of a signal with an IFFT-processed phase reference symbol.

The correlation value output from correlator 1903 is sent to subtraction section 111 and subjected to the same processing as that explained in Embodiment 1. In this way, synchronization pull-in processing is performed.

As shown in FIG. 6, the present embodiment has 0 symbol 1802 inserted after synchronization symbol 1801 in a signal frame. Therefore, under circumstances under which tens of delay signals are received, if signals with high signal power are included, correlation processing is carried out between the 0 symbol of the reception signal and a signal with an IFFT-processed synchronization symbol when a correlation is found between the signal with an IFFT-processed synchronization symbol and the reception signal. In this case, since correlation processing is performed with the 0 symbol, the correlation result becomes very small no matter how high the signal power may be. For this reason, a peak exceeding a threshold is identified near the FFT processing start timing, thus making it possible to accurately detect the FFT processing start timing.

As shown above, since the OFDM communication apparatus of the present embodiment has the 0 symbol inserted immediately after a synchronization symbol used for synchronization pull-in processing making it possible to reduce correlation output near the synchronization timing position. Therefore, the OFDM communication apparatus of the present embodiment can suppress a correlation value exceeding a threshold even if signals with high power are included. As a result, the OFDM communication apparatus of the present embodiment can accurately detect FFT processing start timing and prevent desynchronization.

The OFDM communication apparatus according to the present embodiment can reduce processing delays more than the OFDM communication apparatuses according to Embodiments 1 to 12 above.

That is, with the OFDM communication apparatuses according to Embodiments 1 to 12, since synchronization pull-in is carried out using synchronization symbol 201 and phase reference symbol 202, synchronization is established immediately after phase reference symbol 202 if there is no synchronization error. However, since synchronization symbol 201 or phase reference symbol 202 is used to estimate the transmission path, these symbols need to be stored in memory. Thus, a delay is generated by one symbol or two symbols corresponding to synchronization symbol 201 or phase reference symbol 202.

On the other hand, with the OFDM communication apparatus according to the present embodiment, synchronization pull-in is performed using synchronization symbol 1801, synchronization is established immediately after synchronization symbol 1801 if there is no synchronization error. Therefore, the OFDM communication apparatus according to the present embodiment need not store the phase reference symbol, etc. in memory as in the case of Embodiments 1 to 12, and thus can reduce the processing delay.

The present embodiment explains the case where the synchronization pull-in method is used for the OFDM communication apparatus according to Embodiment 1, but the present invention is also applicable to cases where the synchronization pull-in method above is used for Embodiments 2 to 10.

(Embodiment 14)

The present embodiment explains a case where a synchronization pull-in method, which is different from the above three methods, is used. As the synchronization pull-in method using synchronization symbols in the frame shown in FIG. 4, there is another method of detecting a maximum value of the result of correlation between the reception signal and this reception signal delayed as appropriate in addition to the method explained in Embodiment 13. The OFDM communication apparatus according to the present embodiment uses this synchronization pull-in method. Here, a case where this synchronization pull-in method is used in the OFDM communication apparatus according to Embodiment 1 is explained as an example with reference to Embodiment 13 and using FIG. 24.

Figure 24:
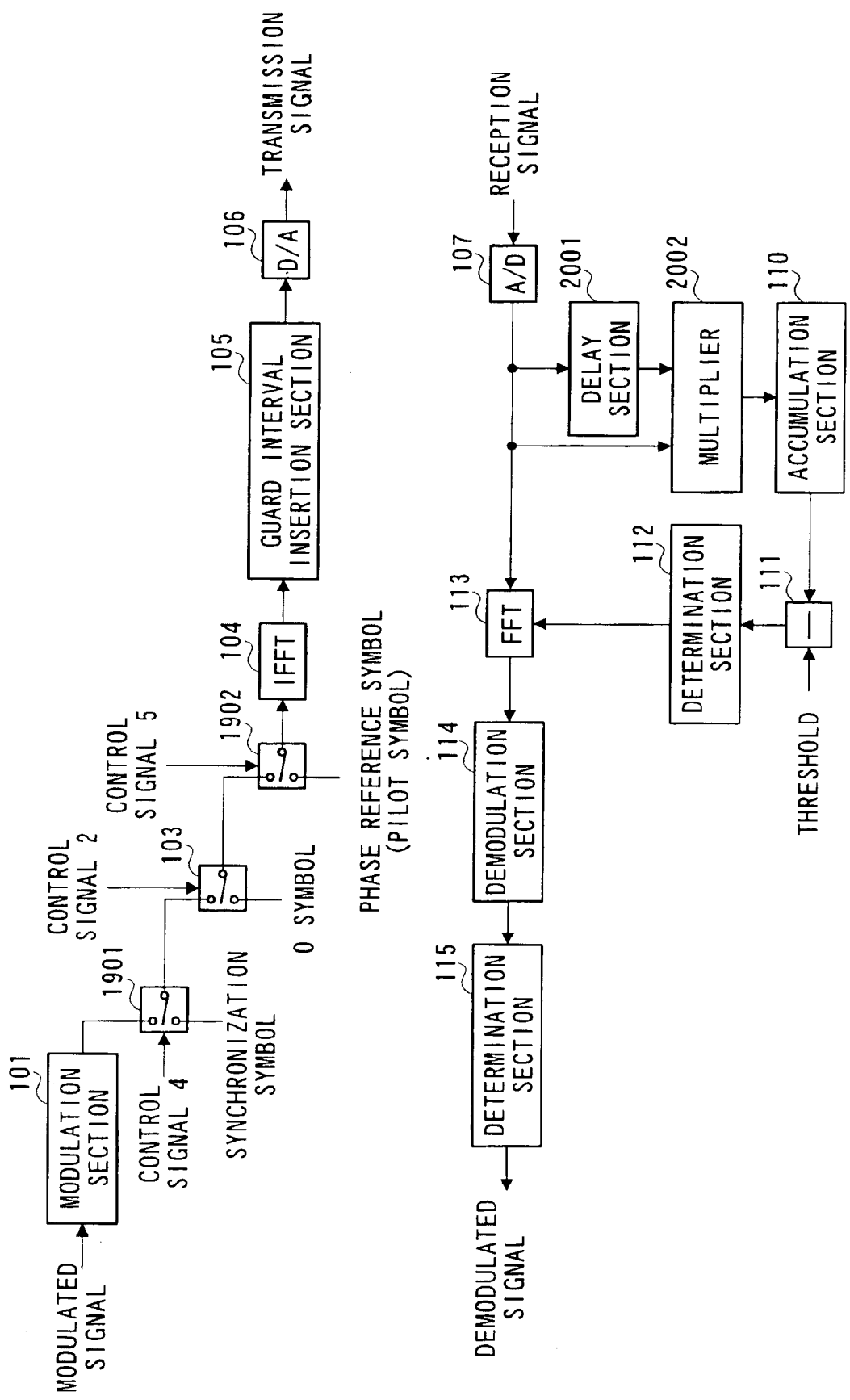
FIG. 24 is a block diagram showing a configuration of an OFDM communication apparatus according to Embodiment 14 of the present invention.

FIG. 24 is a block diagram showing a configuration of the OFDM communication apparatus according to Embodiment 14 of the present invention. In FIG. 24, the same parts as those in FIG. 5 and FIG. 23 are assigned the same codes as those in FIG. 5 and FIG. 23 and their detailed explanations are omitted.

In the present embodiment, a frame similar to the frame (FIG. 22) in Embodiment 13 is used. Here, since a signal pattern with signals only placed on every (integer multiple of n)th subcarrier is used, synchronization symbol 1801 in the frame shown in FIG. 22 consists of a same waveform repeated at every 1/n cycle. The following is an example where n=4 is assumed, however, it goes without saying that the present invention is also applicable to cases where n is changed as appropriate.

In the reception section, the signal output from A/D converter 107 (reception signal) is sent to FFT section 113, multiplier 2002 and delay section 2001. Delay section 2001 outputs the reception signal delayed by 1/n symbol to multiplier 2002. Since n=4 is assumed here, delay section 2001 delays the reception signal by ¼ symbol. Multiplier 2002 finds a correlation between the signal output from A/D converter 107 and the signal output from delay section 2001. That is, multiplier 2002 finds a correlation between the reception signal and this reception signal delayed by ¼ symbol. The correlation result from multiplier 2002 is sent to accumulation section 110 where the same processing as that in Embodiment 1 above is carried out.

In the present embodiment, as shown in FIG. 22, 0 symbol 1802 is inserted after synchronization symbol 1801 in a signal frame. Therefore, under circumstances under which tens of delay signals are received, if signals with high power are included, correlation processing is carried out between the 0 symbol of the reception signal and the synchronization symbol when a correlation is found between the reception signal and this reception signal delayed by ¼ symbol. In this case, since correlation processing is performed with the 0 symbol, the correlation result becomes very small no matter how high the signal power may be. For this reason, a peak exceeding a threshold is identified near the FFT processing start timing, thus making it possible to in accurately detect the FFT processing start timing.

As shown above, since the OFDM communication apparatus of the present embodiment has the 0 symbol inserted immediately after the synchronization symbol used for synchronization pull-in processing, making it possible to reduce correlation output near the synchronization timing position. Therefore, the present embodiment can suppress a correlation value exceeding a threshold even if signals with high power are included. As a result, the present embodiment can accurately detect FFT processing start timing and prevent desynchronization.

The present embodiment explains the case where the synchronization pull-in method above is used for the OFDM communication apparatus according to Embodiment 1, but the present invention is also applicable to cases where the synchronization pull-in method above is used for Embodiments 2 to 12.

The OFDM communication apparatus of the present invention is applicable to a communication terminal apparatus such as a mobile station apparatus and a base station apparatus in a radio communication system.

Embodiments 1 to 14 explain cases where a 0 symbol (signal) or inverted symbol (signal) is inserted immediately after a phase reference symbol used for delay detection, but the present invention is also applicable to a case where a 0 symbol (signal) or inverted symbol (signal) is inserted immediately after a pilot symbol, which is a phase reference symbol used for synchronization detection. In this case, demodulation section 114 carries out coherent detection instead of delay detection.

The present invention is not limited to Embodiments 1 to 14 above, but can be implemented with various modifications. Moreover, Embodiments 1 to 14 above can be implemented in various combinations thereof as appropriate.

Furthermore, the present invention is explained when applied to cases where the above methods are used as the synchronization pull-in method. However, the present invention is not limited to this, but is applicable to cases where any synchronization pull-in method is used which adopts steps of calculating a correlation value using the reception signal and detecting a maximum value of the calculation result. At this time, it goes without saying that a correlation value suppression signal is inserted immediately after a symbol used for the synchronization pull-in processing, that is, a symbol used for correlation value calculation processing.

As explained above, the OFDM communication apparatus of the present invention inserts a 0 symbol (0 signal), which is a correlation value suppression signal, or inverted symbol (inverted signal) after a phase reference symbol used for delay detection or a pilot symbol used for synchronization detection, making it possible to accurately detect FFT processing start timing and prevent desynchronization even under circumstances under which tens of delay signals are received.

The present invention is not limited to the above described embodiments, and various variations and modifications may be-possible without departing from the scope of the present invention.

This application is based on the Japanese Patent Application No. HEI 11-215459 filed on Jul. 29, 1999, and the Japanese Patent Application No. HEI 10-308913 filed on Oct. 29, 1998, entire content of which is expressly incorporated by reference herein.

What is claim is:

1. An OFDM transmission apparatus comprising:

an adder that adds symbols for synchronization pull-in to a valid symbol, said symbols for synchronization pull-in comprising a synchronization symbol and a phase reference symbol that is identical to the synchronization symbol; and an inserter that inserts a correlation value suppression signal immediately after the symbols for synchronization pull-in, wherein:

the correlation value suppression signal occupies a shorter interval than a cycle of the phase reference symbol.

2. An OFDM transmission apparatus comprising:

an adder that adds symbols for synchronization pull-in to a valid symbol, said symbols for synchronization pull-in comprising a synchronization symbol of a waveform repeating in a 1/n cycle, and an inserter that inserts a correlation value suppression signal immediately after the symbols for synchronization pull-in, wherein:

the correlation value suppression signal occupies a shorter interval than a cycle of the synchronization symbol.

3. An OFDM communication method comprising:

adding symbols for synchronization pull-in to a valid symbol, said symbols for synchronization pull-in comprising a synchronization symbol and a phase reference symbol that is identical to the synchronization symbol;

inserting a correlation value suppression signal immediately after the symbols for synchronization pull-in;

delaying a reception signal by a symbol unity;

calculating a correlation value of the reception signal, as received, and the delayed reception signal; and establishing symbol synchronization by carrying out a threshold determination of the calculated correlation value.

* * * * *